(12) United States Patent  
Miyazawa et al.

(10) Patent No.: US 6,446,039 B1
(45) Date of Patent: Sep. 3, 2002

(54) SPEECH RECOGNITION METHOD, SPEECH RECOGNITION DEVICE, AND RECORDING MEDIUM ON WHICH IS RECORDED A SPEECH RECOGNITION PROCESSING PROGRAM

(75) Inventors: Yasunaga Miyazawa, Okaya; Mitsuhiro Inazumi, Shiojiri; Hiroshi Hasegawa, Chino; Masahisa Ikejiri, Chofu, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/378,997

(22) Filed: Aug. 23, 1999

(30) Foreign Application Priority Data

Sep. 8, 1998 (JP) .......................................... 10-254419

(51) Int. Cl.7 .............................................. G10L 15/28
(52) U.S. Cl. ..................................... 704/255; 704/250
(58) Field of Search ................................. 704/251, 243, 704/252, 254, 255, 256, 249, 250, 230, 221, 222, 257

(56) References Cited

U.S. PATENT DOCUMENTS

| 5,307,442 | A | * | 4/1994 | Abe et al. .................... 704/270 |
| 5,930,753 | A | * | 7/1999 | Potamianos et al. ........ 704/256 |
| 5,983,178 | A | * | 11/1999 | Naito et al. ................. 704/245 |
| 6,029,124 | A | * | 2/2000 | Gillick et al. ................ 704/200 |
| 6,236,963 | B1 | * | 5/2001 | Naito et al. ................. 704/241 |

FOREIGN PATENT DOCUMENTS

JP  55-21035  2/1980

(List continued on next page.)

OTHER PUBLICATIONS

Nakamura, Satoshi et al., "Application to HMM Phonome Recognition of Vector Quantization Speaker Adaptation", *Journal of Japan Acoustic Study*, vol. 45, No. 12, Dec. 1, 1989, pp. 942–949 & 1004.

Niimi, Yasuhisa et al., "Speaker Adaptation of a Code Book of Vector Quantization", *Japan Acoustic Study Fall Study Presentation 1987, Compiled Theses of Presentation*, Oct. 1987, pp. 75–76.

*Primary Examiner*—Richemond Dorvil
(74) *Attorney, Agent, or Firm*—Oliff & Berridge, PLC

(57) ABSTRACT

This invention concerns obtaining high recognition capability while there is a large limitation on memory capacity and processing ability of a CPU. When several words are selected as registration words among a plurality of recognizable words, a recognition target speaker speaks the respective registration words, registration word data for the respective registration words from the sound data is created and saved in a RAM. When the recognition target speaker speaks a registration word, sound is recognized using the registration word data, and when recognizable words other than the registration words are recognized, sound is recognized using specific speaker group sound model data. Furthermore, speaker learning processing is performed using the registration word data and the specific speaker group sound model data, and when recognizable words other than the registration words are recognized, sound is recognized using post-speaker learning data for speaker adaptation.

21 Claims, 13 Drawing Sheets

| | U.S. PATENT DOCUMENTS | | | JP | 62-27719 | 6/1987 |
|---|---|---|---|---|---|---|
| | | | | JP | 62-57037 | 11/1987 |
| JP | 56-140398 | 11/1981 | | JP | 64-65600 | 3/1989 |
| JP | 57-22300 | 2/1982 | | JP | 64-88500 | 4/1989 |
| JP | 57-63599 | 4/1982 | | JP | 1-113799 | 5/1989 |
| JP | 57-64295 | 4/1982 | | JP | 1-309099 | 12/1989 |
| JP | 57-64298 | 4/1982 | | JP | 3-206500 | 9/1991 |
| JP | 58-224392 | 12/1983 | | JP | 4-280299 | 10/1992 |
| JP | 59-93500 | 5/1984 | | JP | 5-24996 | 9/1993 |
| JP | 59-193500 | 11/1984 | | JP | 2561553 | 9/1996 |
| JP | 60-45298 | 3/1985 | | JP | 9-26799 | 1/1997 |
| JP | 60-129795 | 7/1985 | | JP | 2704216 | 10/1997 |
| JP | 60-162298 | 8/1985 | | | | |
| JP | 61-70594 | 4/1986 | | * cited by examiner | | |

SPEECH RECOGNITION METHOD, SPEECH RECOGNITION DEVICE, AND RECORDING MEDIUM ON WHICH IS RECORDED A SPEECH RECOGNITION PROCESSING PROGRAM

BACKGROUND OF THE INVENTION

1. Field of Invention

This invention relates to a speech recognition method, a speech recognition device, and a recording medium on which is recorded a speech recognition processing program, in which improved recognition capability is achieved by enabling speaker adaptation processing in which the speaker can be registered with respect to a specified word among recognizable words.

2. Description of Related Art

Recently, electronic devices which use speech recognition technology are used in various fields. As one example, a clock which is called a sound clock can be listed. In this sound clock, a current time and an alarm time can be set by sound, and the sound clock can inform a user of a current time by sound.

This type of sound clock can be used as a toy for children in addition to being used as a daily necessity. It is desired that the cost of the device itself can be as low as possible. Because of this, there is a large limitation on the CPU processing capability and memory capacity which are used. One of the problems to be solved is to have functions with high capability under these limitations.

Conventionally, many devices which use this type of speech recognition can perform speech recognition for a non-specific speaker, but in order to perform speech recognition for a non-specific speaker, a large size of standard speaker sound model data is needed, and a large-capacity ROM and a CPU with high processing ability are needed. Therefore, the cost can be eventually high.

Furthermore, even for a non-specific speaker, depending upon the type of the device, generation and gender which can be used are limited to a certain degree. As a result, standard speaker model data which is limited to a certain area is acceptable. Because of this, even if a large size of standard speaker sound model data is provided, there is a lot of waste. Additionally, there was a problem of a recognition percentage because it can correspond to a wide variety of non-specific speakers in an averaged manner.

In order to solve this problem, a relatively inexpensive speech recognition LSI exists which enables non-specific speaker recognition with respect to a plurality of recognizable words which are prepared in advance, and which, at the same time, has a function which performs a registration type of speech recognition by registering a sound of a specific speaker for the specific speaker.

In this type of speech recognition LSI, a word which is prepared in advance can certainly be recognized even for a sound of a non-specific speaker. Furthermore, sound data of a specific speaker can be registered for the specific speaker. Therefore, it is thought that speech recognition with high capability can be realized for a wide variety of speakers.

However, with respect to this type of conventional speech recognition LSI, recognition can be performed at a high recognition percentage for speech recognition for a registered specific speaker, but if the gender and/or age range of speakers is wide, the recognition percentage can be significantly decreased in general with respect to speech recognition for non-specific speakers.

Furthermore, in order to improve the recognition percentage for a non-specific speaker, there are devices such that a speaker speaks several dozen words and speaker adaptation can be performed based upon this sound data.

However, in general, there are many cases such that the speaker adaptation function can be applied to a device with a CPU with high processing capability and a large-capacity memory. There are many cases such that it is difficult to apply this function to a device with large limitations in the processing capability of the CPU and the memory capacity because low cost is strongly demanded for toys and daily necessities.

SUMMARY OF THE INVENTION

Therefore, one aspect of this invention is to register sound data which is obtained as a speaker who uses the device, speaks a specified word, and at the same time, to significantly improve the speech recognition percentage for the speaker who uses the device (recognition target speaker), by performing speaker adaptation using this registration data and the standard speaker sound model data.

In order to achieve this aspect, the speech recognition method and apparatus of this invention may have standard speaker sound model data which has been created from sound data of a plurality of non-specific speakers, and can recognize a plurality of predetermined words. Among the plurality of words which can be recognized, several words are selected as registration words. The recognition target speaker speaks the respective registration words, and registration word data is created and saved for the respective registration words from the sound data. When the registration words are spoken by the recognition target speaker, speech recognition is performed by using the registration word data. When other recognizable words are spoken, speech recognition is performed using the standard speaker sound model data.

In addition, the plurality of recognizable words may be divided according to the respective type of words, and are prepared as word sets which correspond to the respective divisions. A device is set to recognize words which belong to a given word set in the operating scene at a given point in time, determine which word set a word is input from at the current point in time, and based upon the determination result, the recognition of the word which has been input in the scene can be performed.

Furthermore, it is also acceptable to focus the recognition target speaker into an area which is set in advance based upon age and gender, create specific speaker group sound model data from the sound data of a plurality of non-specific speakers which belong to the area, and save this as the standard speaker group sound model data.

The recognition target speakers can include a plurality of speaker groups based upon the characteristics of the sound. The specific speaker group sound model data can also include specific speaker group sound model data corresponding to the plurality of speaker groups which have been created from the sound data of a plurality of non-specific speakers which belong to the respective speaker groups.

In addition, speaker learning processing may be performed using the registration word data, the standard speaker sound model data, and the specific speaker group sound model data, such that when a recognizable word other than one of the registration words is recognized, adaptation processing can be performed using the post-speaker learning data, and speech recognition is performed.

Additionally, the speaker learning processing may create an inputting speaker code book by a code book mapping method and any of the code books which has been created based upon the standard speaker sound model data or the specific speaker group sound model data. Furthermore, by using a universal code book, the inputting speaker code book may be vector-quantized, and a quantized inputting speaker code book may be created.

Furthermore, the speech recognition device of this invention may have standard speaker sound model data which has been created from the sound data of a plurality of non-specific speakers, and which can recognize a predetermined plurality of words. The speech recognition part has at least a sound analysis unit that analyzes sound which has been obtained as a speaker speaks, several words among the plurality of recognizable words being selected as registration words; registration word data which has been created for the respective registration words from sound data which has been obtained by having the recognition target speaker speak the respective registration words; and a controller which, when one of the registration words is spoken by the recognition target speaker, performs speech recognition using the registration word data, and which, when recognizable words other than the registration words are spoken, performs speech recognition using the standard speaker sound model data.

In this type of speech recognition device, the plurality of recognizable words may be divided according to the respective word type, and are prepared as word sets corresponding to the respective divisions. The device is set to recognize words in a given word set in the operating scene at that point in time. It is determined which word set a word is input from at the current point in time. Recognition of words input in the scene is performed based upon the determination result.

Furthermore, it is also acceptable to focus the recognition target speaker into an area which is set in advance, based upon age and gender, create specific speaker group sound model data from the sound data of a plurality of non-specific speakers which belong to the area, and save this as the standard speaker group sound model data.

In addition, the recognition target speakers can include a plurality of speaker groups, based upon the characteristics of the sound. The specific speaker group sound model data can also include specific speaker group sound model data corresponding to the plurality of speaker groups which have been created from the sound data of a plurality of non-specific speakers which belong to the respective speaker groups.

Furthermore, in the speech recognition device of this invention, the speaker learning processing may be performed using the registration word data, the standard speaker sound model data, and the specific speaker group sound model data. When recognizable words other than the registration words are recognized, speaker adaptation is performed using the post-speaker learning data, and speech recognition is performed.

Additionally, the speaker learning processing may create an inputting speaker code book by a code book mapping method and any of the code books which has been created based upon the standard speaker sound model data or the specific speaker group sound model data. By using the universal code book, the inputting speaker code book may be vector-quantized, and a quantized inputting speaker code book may be created.

Furthermore, a recording medium on which is recorded the speech recognition processing program of this invention may have standard speaker sound model data which has been created from the sound data of a plurality of non-specific speakers, and is a recording medium on which is recorded a speech recognition processing program which can recognize a plurality of predetermined words. The processing program may include a procedure which, with respect to several words which are selected as registration words among the plurality of recognizable words, creates and saves registration word data for the respective registration words from the sound data which has been obtained as the recognition target speaker speaks, and a procedure which, when a registration word is spoken by the recognition target speaker, performs speech recognition using the registration word data, and which, when a recognizable word other than recognizable words is spoken, recognizes the sound using the standard speaker sound model data.

The plurality of recognizable words may be divided according to the respective word type, and are prepared as word sets corresponding to the respective divisions. The device is set to recognize words in a given word set in the operating scene at that point in time. It is determined which word set a word is input from at the current point in time. Recognition of words input in the scene is performed based upon the determination result.

In addition, it is also acceptable to include a procedure that focuses the recognition target speaker into an area based upon age and gender, to create specific speaker group sound model data from the sound data of a plurality of non-specific speakers which belong to the area, and save this as the standard speaker group sound model data.

Furthermore, in the procedure where the specific speaker group sound model data is created and saved as the standard speaker group sound model data, the recognition target speakers may include a plurality of speaker groups based upon the characteristics of sound, and for specific speaker group sound model data, specific speaker group sound model data may be created corresponding to the plurality of speaker groups from sound data from a plurality of non-specific speakers which belong to the respective speaker groups.

In addition, the program has a procedure which performs speaker learning processing using the registration word data and the standard speaker sound model data or the specific speaker group sound model data. When a recognizable word other than the registration words is recognized, speaker adaptation is performed using postspeaker learning data, and speech recognition is performed.

Thus, this invention may select several words as registration words among a plurality of recognizable words which are prepared in advance and creates and saves registration word data for the respective registration words from the sound data when the speaker who is the recognition target speaks the respective registration words. Words which are frequently used are mainly selected as the registration words. A word which is frequently used has a high possibility of being spoken by a speaker in various situations. For example, there are many cases that the frequently-used word can be input from a position distant from the device. Even if a word is thus input from a position distant from the device, correct recognition is required.

Therefore, for example, if frequently-used words are registered as several words among a plurality of recognizable words, it is possible to improve recognition capability for these words, and the recognition percentage of all the recognizable words can be improved. Therefore, the user can use the device conveniently.

Furthermore, in this invention, according to the operation scene at a given point in time, the device may determine which word set words should be input from, and recognition of a word which has been input at the current time can be performed based upon the determination result. Therefore, for example, a plurality of registration words belong to the same word set, and the scene where these words will be input is determined for words which belong to the word set. Therefore, a high recognition percentage can be obtained because it is only necessary to perform recognition processing for the words within the word set.

Additionally, by thus using several words as registration words and creating registration word data corresponding to the speaker, speaker learning processing can be performed using registration word data, standard speaker sound model data, or specific speaker group sound model data. By so doing, even for recognizable words other than registration words, it becomes possible to perform speaker adaptation and speech recognition post-speaker learning data at the time of recognition. The recognition percentage can be significantly improved for all of the recognizable words, not just the registration words.

The speaker adaptation processing of this invention includes processing which creates an inputting speaker code book by the code book mapping method and any of the code books which has been created based upon standard speaker sound model data or specific speaker group sound model data, and vector-quantizes this inputting speaker code book using a universal code book which has been created from a wide variety of speakers, creating a quantized inputting speaker code book. When recognition is performed, speaker learning processing is performed using this quantized inputting speaker code book.

Thus, speaker adaptation processing is possible using the quantized inputting speaker code books, in which the data amount has been significantly reduced. Therefore, it is possible to minimize a memory (RAM) in which these are saved. Furthermore, because it is possible to significantly reduce the calculation amount which is needed for the recognition processing, it is possible to significantly reduce the processing burden on the controller (CPU), and a CPU with a small processing ability can be acceptable.

Furthermore, in this invention, the speaker who is a recognition target is focused into an area which is set in advance based upon age and gender. Specific speaker group sound model data is created and saved from the sound data of a plurality of non-specific speakers which belong to the area, and sound which has been input by the speaker who is the recognition target can be recognized using this specific speaker group sound model data.

This is effective when the user of this device is limited to a certain area, such as predominantly children or predominantly women.

When the speaker who is the recognition target can be thus focused into a certain area, even if standard speaker sound model data which can correspond to a speaker in any area is used, there is still a lot of waste, and not much recognition accuracy can be expected. Therefore, a speaker who is the recognition target among non-specific speakers is focused into an area which is set in advance based upon age and gender. Specific speaker group sound model data is created from the sound data of a plurality of speakers who belong to the area, and by using this specific speaker group sound model data, sound which has been input by the speaker who is the speech recognition target is recognized.

By so doing, because it is acceptable to provide specific speaker group sound model data in response to speaker groups in a certain area, the data amount can be significantly reduced, compared to the conventional standard speaker sound model data which has been created corresponding to a variety of speakers. Because of this, the memory capacity of a memory which saves the data can be minimized, and the burden of the recognition processing on the CPU can be reduced. In addition, because it is sound model data corresponding to specific speaker groups, the recognition capability can be significantly improved.

Additionally, it is also possible to prepare several of this type of specific speaker group sound model data that corresponds to speaker groups in certain areas. For example, male adults, female adults, and children can be prepared corresponding to several speaker groups. According to this, the device is effective when one device is used by a family.

Thus, even if specific speaker group sound model data corresponding to several speaker groups is provided, if it is limited to a certain area, the size of the sound model data can be minimized compared to having standard speaker sound model data which has been created corresponding to speakers in all areas. Furthermore, because it is specific speaker group sound model data corresponding to the respective speaker groups, recognition capability can be significantly improved.

DETAILED DESCRIPTION OF PREFERRED EMBODIMENTS

The following explains an embodiment of this invention with reference to the drawings. Furthermore, in this embodiment, a sound clock device is explained as one example of a speech recognition device. This sound clock device (hereafter occasionally referred to as "a device") can set the current time and an alarm time by a sound spoken by a speaker. Furthermore, informing the user of the time from the device can be performed by sound, and this is a device which has a strong toy feature in which a simple conversation can be carried out between the device and the speaker.

Figure 1A:
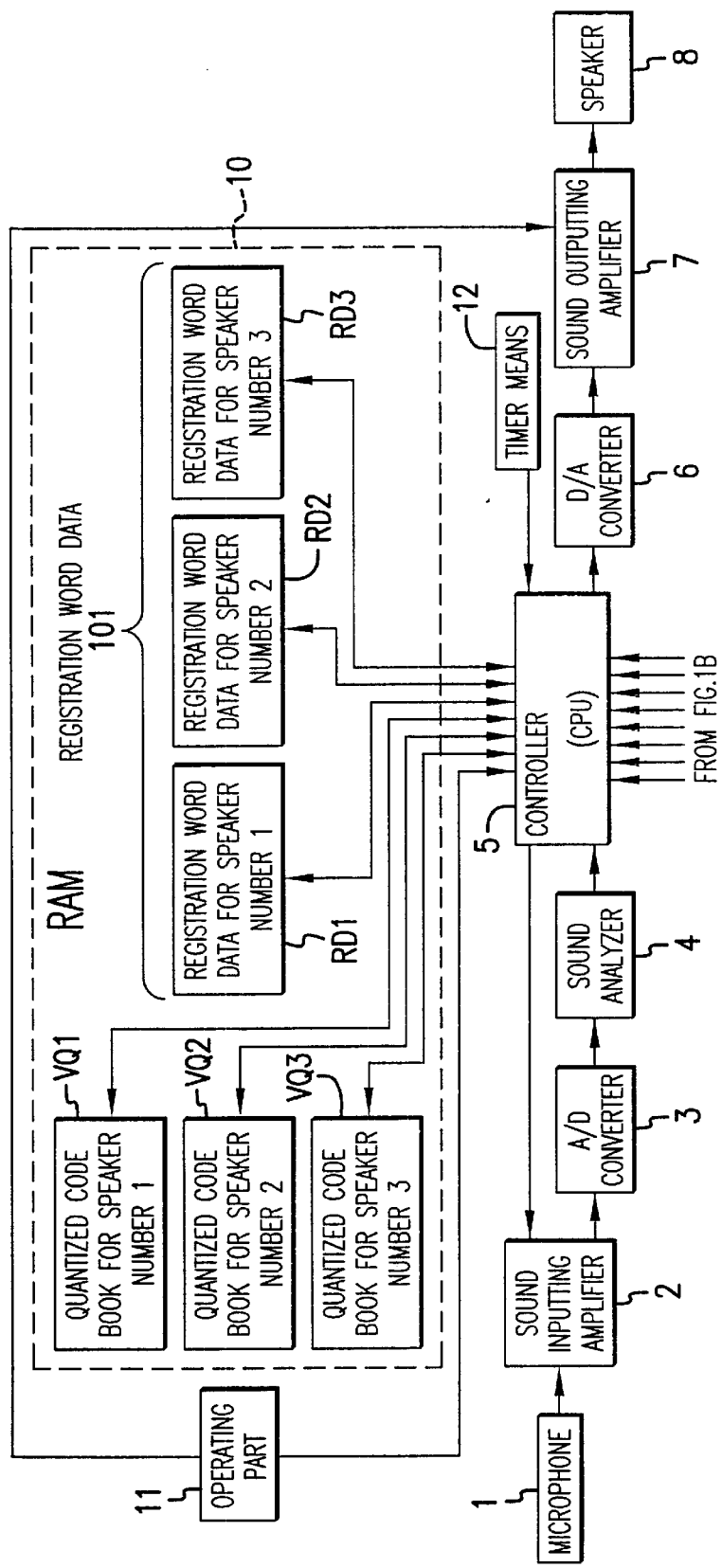
FIG. 1 is a block diagram explaining an exemplary embodiment of a speech recognition device of this invention.
Figure 1B:
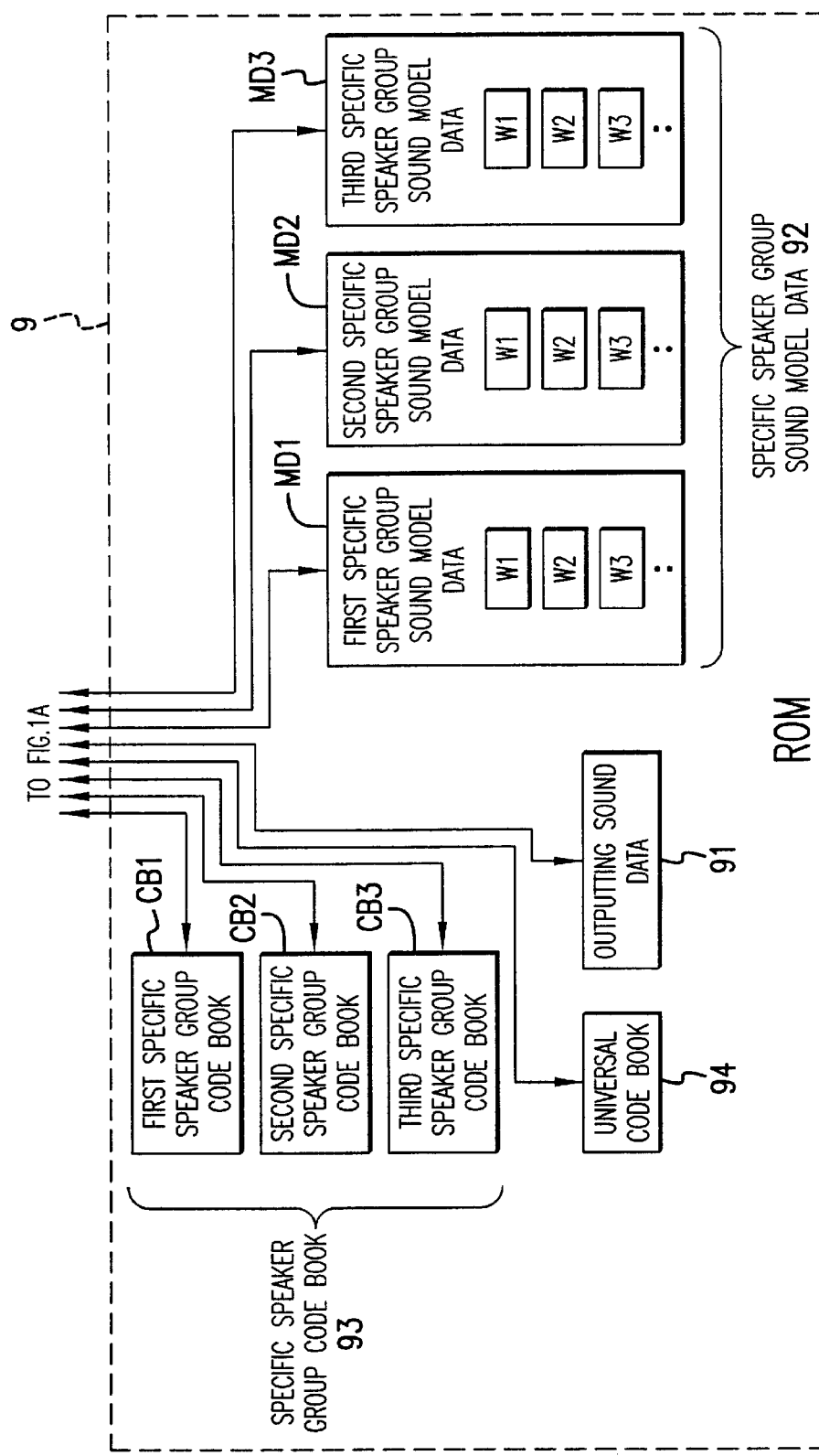

FIG. 1 is a block diagram showing each structural element which is needed for the structure of a sound clock device which is an embodiment of this invention. First, the structure shown in FIG. 1 is schematically explained, and after that, the parts which are particularly needed for the explanation of the embodiment of this invention are described in detail.

This sound clock device is basically structured by a microphone 1 as a sound inputting part, a sound inputting amplifier (microphone amplifier) 2, an A/D converter 3, a sound analyzer 4, a controller (CPU) 5 which performs various processing, a D/A converter 6, a sound outputting amplifier 7 as a sound outputting part, a speaker 8, a ROM 9 as a first memory means, a RAM 10 as a second memory means, an operating part 11 with which a user performs various settings for the device, and a clock 12 which generates a clock signal.

The sound analyzer 4 analyzes an A/D-converted sound signal for a short time by using a calculator, obtains a pitch cycle and/or the like, and outputs characteristic data which shows the characteristics of the sound (LPC cepstrum coefficient is general as time series data).

The controller 5 performs various processing, explained hereafter, such as speech recognition, learning, registration, and sound outputting. These processes will be explained in the operation explanation discussed later.

ROM 9 stores outputting sound data 91, specific speaker group sound model data 92, a code book (specific speaker group code book) which has been created based upon the specific speaker group sound model data 92, a universal code book 94, and the like.

The outputting sound data 91 is sound data for the conversation content which performs responses and inquiries to the speaker from the device side, and the specific content will be explained in the operation example discussed below.

Furthermore, the specific speaker group sound model data 92 is standard speaker sound model data for the recognition target speaker which has been focused into a certain area. For example, when the recognition target speaker is focused on children, this is standard speaker sound model data which has been created from the sound data of many non-specific children.

However, in this embodiment, three speaker groups such as male adults, female adults, and children are set. Male adults are defined as a speaker group A, female adults are defined as a speaker group B, and children are defined as a speaker group C. Furthermore, a first specific speaker group sound model data MD1 which has been created from the sound data of many non-specific male adults who belong to the speaker group A, a second specific speaker group sound model data MD2 which has been created from the sound data of many non-specific female adults who belong to the speaker group B, and a third specific speaker group sound model data MD3 which has been created from the sound data of many non-specific children who belong to the speaker group C are provided.

Furthermore, the first through third specific speaker group sound model data MD1, MD2, and MD3 include several word sets w1, w2, and w3 . . . formed of predetermined recognizable words. The specific speaker group sound model data which is stored in the word set w1 is specific speaker group sound model data for words (in this case, assumed to be the words "good morning", "I'm home", "good afternoon", "good night", "o'clock", and "alarm") which are considered to be used particularly frequently during conversation between the device and the speaker. The specific speaker group sound model data for the respective words within the word set w1 can be used as speaker learning processing, discussed below.

The specific speaker group sound model data which is stored in the word set w2 is specific speaker group sound model data for the words which show hour units such as "one o'clock", "two o'clock", "three o'clock" . . . "twelve o'clock". Furthermore, the specific speaker group sound model data which is stored in the word set w3 is specific speaker ground sound model data for the words which show minute units such as "one minute", "two minutes", "three minutes" . . . "fifty-nine minutes".

In addition, the specific speaker group sound model data for the words which are needed to carry out conversation between the speaker and the device, words which show affirmative and negative feelings such as "yes" and "no", and the like are provided as word sets which are not illustrated here.

Furthermore, the specific speaker group code book 93 has a first specific speaker group code book CB1 which has been created based upon the first specific speaker group sound model data MD1, a second specific speaker group code book CB2 which has been created based upon the second specific speaker group sound model data MD2, and a third specific speaker group code book CB3 which has been created based upon the third specific speaker group sound model data MD3.

Incidentally, words such as "good morning", "I am home", "good afternoon", "good night", "what time", and "alarm" which belong to the above-mentioned word set W1, are used as registration words. As recognition target speakers, that is, the respective speakers who use this device (assumed here to be three speakers such as speaker number 1, speaker number 2, and speaker number 3), speak the above-mentioned registration words, the respective characteristic data can be stored in RAM 10 as the registration word data 101.

This registration word data 101 is saved for each speaker who is anticipated to use this machine, such as registration word data RD1 for speaker number 1, registration word data RD2 for speaker number 2, and registration word data RD3 for speaker number 3.

Furthermore, a function which creates registration word data for several words can be arbitrarily performed by a user for a speaker who is anticipated to use the device. Therefore, creating and saving the registration word data by using the function is possible, but it is not always necessary to use the function. In order to carry out this function, predetermined word setting is performed by the operating part 11 and registration is performed, but the registration method and the like will be discussed below.

In addition, RAM 10 stores a post-quantization inputting speaker code book VQ1 which has been created for speaker number 1, a post-quantization inputting speaker code book VQ2 which has been created for speaker number 2, and a post-quantization inputting speaker code book VQ3 which has been created for speaker number 3. Each code book will be further discussed below.

One of the characteristics of the device in this embodiment of this invention is to focus a user who uses the device into a certain area, to create specific speaker group sound mode data which has been created from the sound data of many non-specific speakers which belong to the area, and to recognize and process the sound spoken by the user of the device by using the specific speaker group sound model data.

In order to realize this, in this embodiment, users are divided into a speaker group A (male adults), a speaker group B (female adults) and a speaker group C (children). First through third speaker group sound model data MD1, MD2, and MD3, which have been created from the sound data of many non-specific speakers which belong to the respective groups, are provided.

Thus, by focusing the users who use the device into a certain area and using the standard speaker sound model data (first through third speaker group sound model data MD1, MD2, and MD3 in this embodiment) which has been created from the sound data of many non-specific speakers which belong to the area, the size of the standard speaker sound model data can be significantly reduced compared to the case when the standard speaker sound model data for non-specific speakers for a variety of speakers is used, memory size of the ROM 9 can be reduced, and the processing burden of the controller (CPU) 5 can be reduced.

Furthermore, because the speech recognition is performed by using the specific speaker group sound model data (first through third specific speaker group sound model data MD1, MD2, and MD3) according to the respective speaker groups, high recognition percentage can be obtained, compared to the case when the standard speaker sound model data for non-specific speakers is used for a variety of speakers.

With respect to the selection of the specific speaker group sound model data for the speaker who is speaking at a given point in time, for example, buttons are prepared on the operating part 11 which designate the speaker groups, and sound input can be performed after the operation of the button which designates the speaker group C, for example, if the user of the device is a child.

Thus, when the operation of designating the speaker group is performed, the controller 5 determines that the operation has been performed, and speech recognition is performed by using the corresponding specific speaker group sound model data. For example, when the button which designates the speaker group C is operated, the controller 5 determines that it is has been operated, and then speech recognition is performed by using the specific speaker group sound model data MD3.

Furthermore, separately from the above operation, the controller 5 can determine the speaker group of the input sound, based upon the pitch cycle information of the sound which has been input (pitch cycle information which can be obtained when the sound analyzer 4 analyzes the sound) without performing the setting operation of the speaker group by the user of the device, and the speech recognition can be performed by using the corresponding specific speaker group sound model data based upon the determination result.

Figure 2:
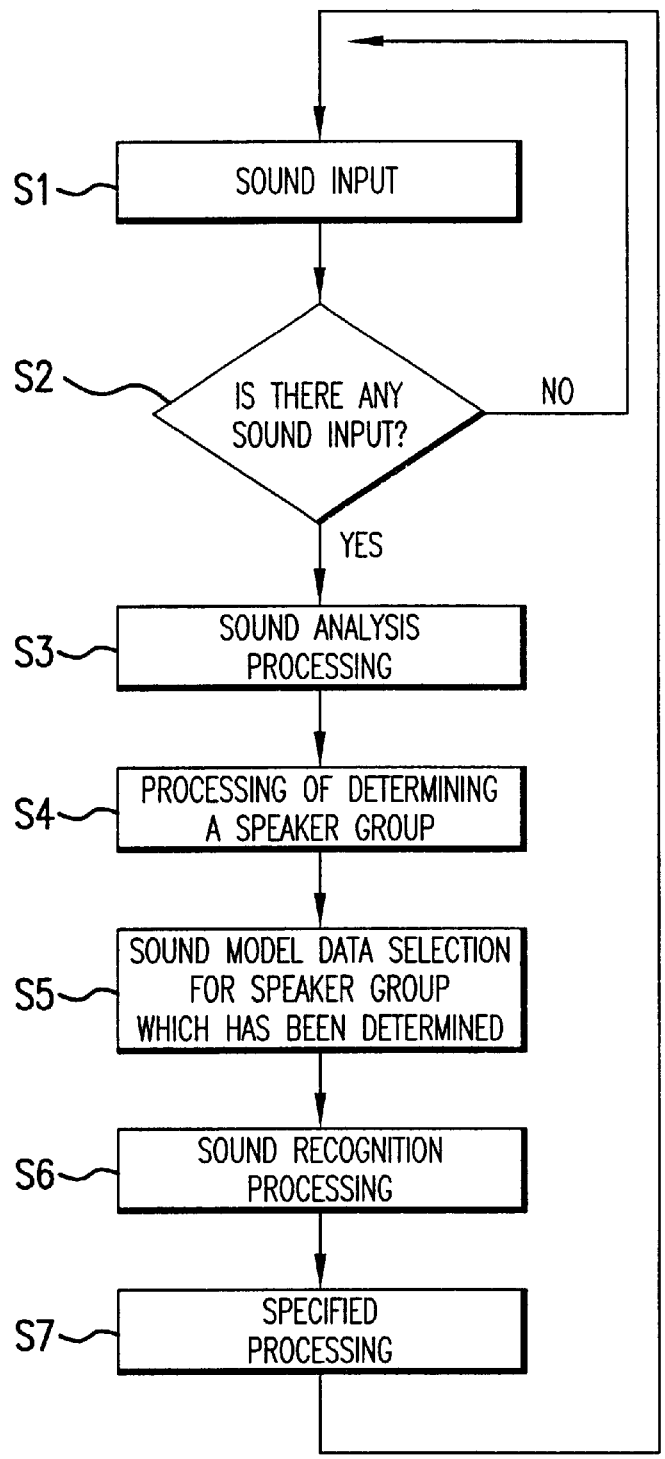
FIG. 2 is a flowchart explaining an example of performing speech recognition processing using sound model data (specific speaker group sound model data) corresponding to a speaker.

FIG. 2 shows a flowchart which performs speech recognition processing by using the sound model data in response to the speaker. Sound spoken by the speaker is input (step s1), it is determined whether sound is input (step s2), and sound analysis is performed for the input sound by the sound analyzer 4 if the sound is input (step s3). Furthermore, through the controller 5, based upon the analysis result, it is determined to which respective speaker group the sound belongs (step s4), the sound model data is selected according to the determined speaker group (step s5), and speech recognition processing is performed (step s6). Furthermore, specified processing is performed based upon the recognition result (step s7). This specified processing is various processing which the device is to perform such as time setting and alarm setting.

Additionally, in this embodiment, with respect to a specific word, the user who uses the device registers the sound data by speaking the specific word, and by using the registered data and the above-mentioned specific speaker group sound model data, speaker learning processing can be performed. Hereafter, this will be discussed.

In order to perform the speaker learning processing, in this embodiment, a user (speaker) speaks words (these words are defined as registration words) which belong to the above-mentioned word set w1 such as "good morning", "I'm home", "good afternoon", "good night", "what time", and "alarm". By the sound data for the respective registration words which is obtained from the speaker, the registration word data is created and is registered in the RAM 10. At this point, for example, if the device is used by one family, registration word data is created by the respective sound data which is obtained from sound successively spoken by the members of the family (for example, father, mother, and children) with respect to a plurality of registration words, and this data is respectively registered.

Specifically, for example, registration word data for the respective registration words which has been created by the respective sound data for the respective registration words which has been obtained from the father (speaker number 1), for example, is saved as speaker number 1 registration word data RD1. The registration word data for the respective registration words which has been created by the sound data for the respective registration words which is obtained from the mother (speaker number 2) is saved as speaker number 2 registration word data RD2. The registration word data for the respective registration word which has been created by the respective sound data for the respective registration words which is obtained from the child (speaker number 3) is saved as speaker number 3 registration word data RD3. The registration is performed as follows.

First of all, mode setting for registering words is performed through the operating part 11. Furthermore, speaker number 1 is designated, and the respective registration words described earlier are successively spoken by speaker number 1. Further, the registration word data RD1 for the registration words is created according to the sound data for the respective registration words which is obtained from speaker number 1. Furthermore, based upon this registration word data RD1 and the specific speaker group sound model data (specific speaker group sound mode data MD1 in this case), a mapping function is created for speaker number 1.

Subsequently, speaker number 2 is designated, and speaker number 2 successively speaks the respective registration words described earlier. Furthermore, registration word data RD2 for the respective registration words is created according to the sound data for the respective registration words which is obtained from speaker number 2. Furthermore, based upon the registration word data RD2 and the specific speaker group model data (specific speaker sound model data MD2 in this case), a mapping function is created for speaker number 2.

Furthermore, speaker number 3 is designated, and the respective registration words described earlier are successively spoken for speaker number 3. Furthermore, registration word data RD1 for the respective registration words is created according to the sound data for the respective registration words which is obtained from speaker number 3. Furthermore, based upon the registration word data RD3 and specific speaker group sound model data (specific speaker group sound model data MD3 in this case), a mapping function is created for speaker number 3.

Thus, the registration of the sound data of the speakers to be registered is completed. Furthermore, by using the respective mapping functions and the first through third specific speaker group code books CB1, CB2, and CB3 (code book size is 256 kb size, respectively), inputting speaker code books are created for the respective speaker numbers 1, 2, and 3. A method which thus creates inputting speaker code books is called a code book mapping method.

In this case, because the speaker number 1 is a father, the speaker number 2 is a mother, and the speaker number 3 is a child, an inputting speaker code book for the father, an inputting speaker code book for the mother, and an inputting speaker code book for the child are respectively created. Furthermore, in this embodiment, in order to reduce the data amount of the inputting speaker code books, by using a universal code book 94 which has been prepared in advance, vector quantization is performed.

This universal code book 94 is a code book is obtained from a wide variety of speakers including all speakers from adults to children. For example, it has a large size such as 1024 or 2048 kb. Vector quantization is performed in the universal code book 94, and code books (256 kb size) are created according to only the code numbers of the universal code book 94.

Thus, by code-booking only by the code numbers of the universal code book 94, the data amount can be significantly reduced.

For example, if some 32 kilobytes of RAM is used for the RAM 10 which is used for the device, in the above-mentioned inputting speaker code book, with respect to one code book, with 256×10 (this 10 is dimensional number of the LPC cepstrum coefficient and this is the case when 10 dimensions are used), or 2,560 coefficients must be saved. When one coefficient is saved as a short type, a total of about 5 kilobytes, such as 2 bytes×2,560, is needed.

Therefore, assuming that four code books are created, a capacity of about 20 kilobytes is needed for just the four code books, the majority of RAM 10 is occupied, and thus, other processing will be hindered.

In order to solve this problem, as described earlier, vector quantization is performed in the universal code book 94, and vector-quantized inputting speaker code books are created according to only the code numbers of the universal code book 94. Furthermore, hereafter, vector-quantized inputting speaker code books are called quantized code books. The code book which has been quantized corresponding to speaker number 1 is called quantized code book VQ1, the inputting speaker code book which has been quantized corresponding to speaker number 2 is called quantized code book VQ2, and the inputting speaker code book which has been quantized corresponding to speaker number 3 is called quantized code book VQ3.

By so doing, a quantized inputting speaker code book for one speaker (for example, a quantized inputting speaker code book VQ1) can save 256 code numbers. When each code number is saved in short style, a total capacity of about 0.5 kilobyte (2 bytes×256) is acceptable. Therefore, the memory capacity which is needed for a code book is $\frac{1}{10}$, compared to the pre-quantization inputting speaker code book described above.

Furthermore, this universal code book 94 can be used for quantized of the registration word data RD1, RD2, and RD3 for the respective inputting speakers described earlier.

Figure 3:
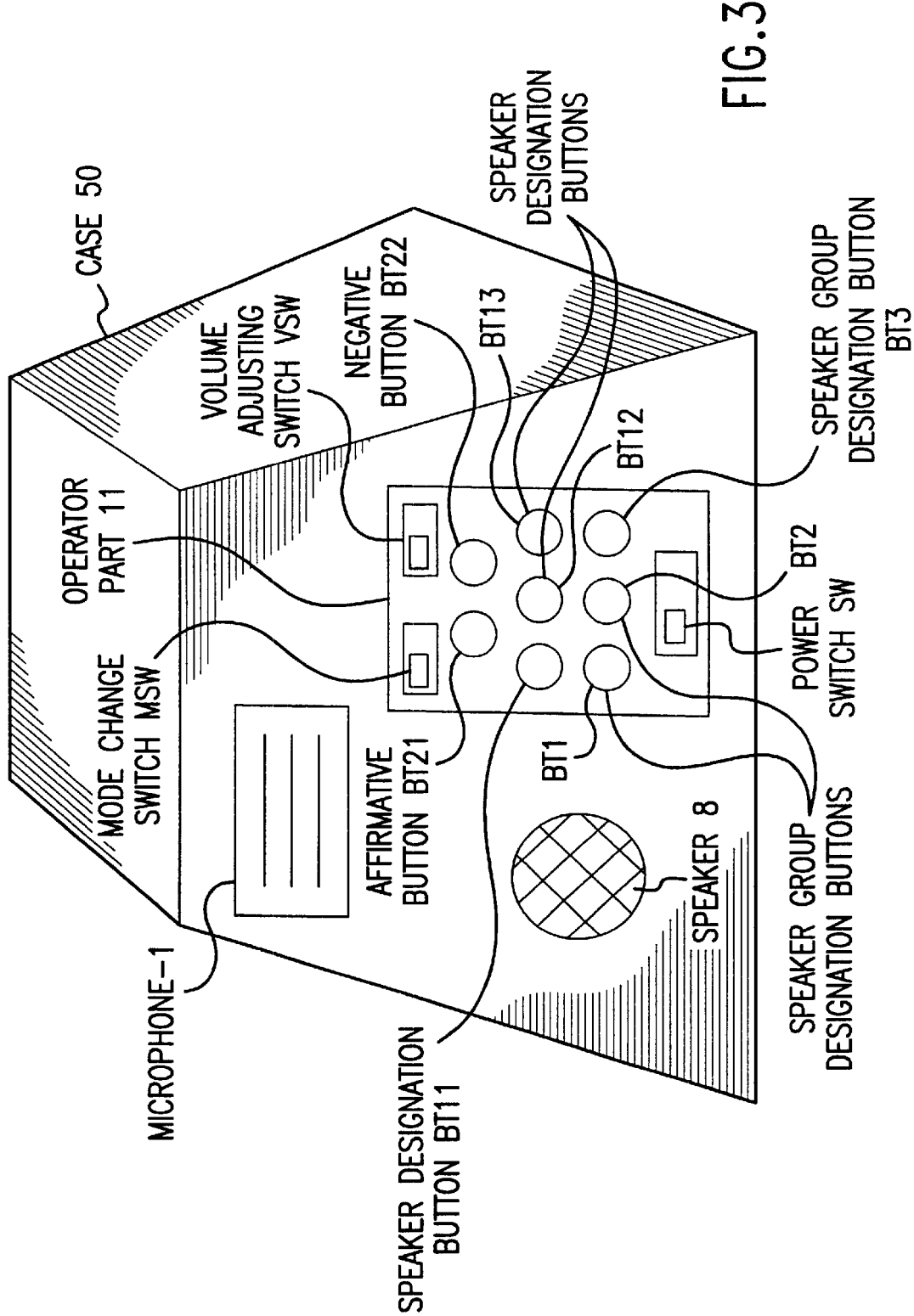
FIG. 3 is a schematic diagram showing the external appearance of a sound clock device in an embodiment of this invention.

FIG. 3 is an external structure of a sound clock device of this embodiment. As described earlier, the sound clock device in this embodiment has a strong toy feature. In fact, characters from popular cartoons can be used for the appearance, but the appearance is not directly related to this invention, so a simple format is used for the explanation.

In FIG. 3, in the case 50 of the sound clock device, a microphone 1, a speaker 8, and an operating part 11 which has various operating buttons (details will be discussed later) which are operated in order to perform operations and when various settings are performed for the device are provided.

This operating part 11 has, for example, a power switch SW, speaker group designation buttons BT1, BT2, and BT3, speaker designation buttons BT11, BT12, and BT13, a mode change switch MSW (whose function will be discussed below) which changes between recognition mode and registration mode, a affirmative button BT21 and a negative button BT22 which input affirmative ("yes") or negative ("no") by the operation of the button by the speaker in response to inquiries from the device side (specific operation examples will be discussed below), and a volume adjusting switch VSW.

Furthermore, the speaker group designation buttons BT1, BT2, and BT3 designate the speaker group of the user who uses the device. The speaker group designation button BT1 designates male adults as a speaker group (speaker group A), the speaker group designation button BT2 designates female adults as a speaker group (speaker group B), and the speaker group designation button BT3 designates children as a speaker group (speaker group C).

Furthermore, the speaker designation buttons BT11, BT12, and BT13 designate the user who uses the device as a speaker, and three users (speaker number 1, speaker number 2, and speaker number 3) can be designated.

Additionally, the various switches and various operating buttons described earlier can be provided in the operating part 11 shown in FIG. 3, but this is an example in which switches and operating buttons are disposed for the convenience of explaining this embodiment. Therefore, they do not always need to all be provided, and it is acceptable to provide only the switches and the operating buttons that are necessary and appropriate according to the functions which the device has. Furthermore, switches such as the power switch sw may be disposed separately from the operating buttons, rather than the operating part 11.

Furthermore, the structure shown in FIG. 3 is one example used for explanation, so the arrangement of the operating part 11, the speaker 8, and the microphone 1, and the arrangement of the various switches and operating buttons within the operating part 11, are not limited to what is shown.

Here, the registration mode and the recognition mode are explained. The setting of either of the registration mode and recognition mode is performed by the mode change switch MSW.

In the registration mode, each speaker who will use the device (speaker number 1, speaker number 2, and speaker number 3) speaks a predetermined plurality of registration words. The registration word data which has been created from the respective sound data is registered as registration word data RD1, RD2, and RD3. Additionally, the speaker learning processing is performed by using the registration word data RD1, RD2, and RD3. Ultimately, the speaker number 1 quantized code book VQ1, the speaker number 2 quantized code book VQ2, and the speaker number 3 quantized code book VQ3 are created.

Specific processing is explained in the case of the registration mode. Here, as described above, the registration word data which has been obtained is registered for the father (speaker number 1), the mother (speaker number 2), and the child (speaker number 3) as they speak the respective registration words.

First of all, the speaker designation button BT11 of the operating part 11 is operated, and the registration words described earlier are successively spoken by speaker number 1 (father) in the registration mode of speaker number 1. By so doing, the registration data RD1 of the registration words is created for speaker number 1. Additionally, a mapping function is created, and vector quantization is performed in the universal code book 94. The quantized inputting speaker code book VQ1 of the speaker number 1 is created according to the code numbers of the universal code book 94.

Subsequently, the speaker designation button BT 12 of the operating part 11 is operated, and the registration words described earlier are successively spoken by speaker number 2 (mother) in the registration mode of speaker number 2. By so doing, the registration data RD2 of the registration words is created for speaker number 2. Additionally, a mapping function is created, and vector quantization is performed in the universal code book 94. The quantized inputting speaker code book VQ2 of speaker number 2 is created according to the code numbers of the universal code book 94.

Continuing further, the speaker designation button BT13 is operated and the registration words described earlier are successively spoken by speaker number 3 (child) in the registration mode of speaker number 3. By so doing, the registration data RD3 of the registration words is created for speaker number 3. Additionally, a mapping function is created, and vector quantization is performed in the universal code book 94. The quantized inputting speaker code book VQ3 of speaker number 3 is created according to the code numbers of the universal code book 94.

Furthermore, at this time, the registration word data RD1, RD2, and RD3 are also vector-quantized using the universal code book 94. Hereafter, the registration word data RD1, RD2, and RD3 is also quantized data.

The following explains the recognition mode. In this case, this recognition mode is a mode which recognizes the sound by using one of the first through third specific speaker group sound model data MD1, MD2, and MD3, the registration word data RD1, RD2, and RD3 for speaker numbers 1, 2, and 3, and the quantized code books VQ1, VQ2, and VQ3 of the speaker numbers 1, 2, and 3, depending upon the situation.

For example, if the mode change switch MSW is in the registration mode, first of all, the speaker who uses the device sets which speaker group is needed. For example, if a speaker who uses the device is speaker number 3 (child), after operating the speaker group designation button BT3 to designate the speaker group C, sound inputting is performed. By so doing, in the controller 5, speech recognition is performed using the third specific speaker group sound model data MD3.

Thus, when the speaker group designation operation is performed by a speaker who uses the device, the controller 5 determines that the speaker group designation operation is performed, and speech recognition is performed using the corresponding specific speaker group sound model data.

Thus, by focusing a user into a specific speaker group and performing speech recognition using specific speaker group sound model data created from the sound data of the speaker which belongs to the speaker group, speech recognition can be performed with higher recognition percentage than in the case when the speech recognition is performed by using a large size of the standard speaker sound model data for a variety of users. Furthermore, because it is acceptable to have specific speaker group sound model data for only several speaker groups, it is possible to significantly reduce the size of the sound model data and minimize the memory size of the ROM 9. Furthermore, the processing burden on the controller (CPU) 5 can be minimized.

Additionally, the determination as to which speaker group the speaker belongs can be made automatically by the device through pitch cycle information which can be obtained by analyzing the sound which has been input. Furthermore, there is also a method of determining to which speaker group the speaker belongs by using a similarity degree which can be obtained by matching the input sound data with the registration word data. The case where the speaker group is determined by pitch cycle information only is discussed here.

That is, in the case of three speakers such as a father, a mother, and a child, the pitch cycle of the child is normally the shortest, the pitch cycle of the mother is normally the second to the shortest, and the pitch cycle of the father is normally the longest among the three family members. According to the pitch cycle information, it can be determined which speaker among the speaker numbers 1, 2, and 3 is speaking.

Thus, for example, when it is determined that the inputting speaker is speaker number 1, speech recognition can be performed using the registration word data RD1 and the quantized inputting speaker code book VQ1 which has been created by the speaker learning processing corresponding to speaker number 1. That is, when a word spoken by speaker number 1 is a registration word, speech recognition is performed through the registration word data RD1 corresponding to speaker number 1. With respect to other than the registration words, the speech recognition is performed using the quantized inputting speaker code book VQ1. Furthermore, if the registration word data is not created and the speaker learning processing is not performed, the speech recognition is performed using the specific speaker group sound model data 92.

Furthermore, in this invention, as the procedure of a conversation which is carried out between the device and the speaker, first of all, any of the registration words among the registration words described earlier can be spoken by the user. That is, on the device side, first of all, a conversation procedure is set which recognizes a registration word which belongs to the word set w1. Thus, in this invention, according to the operation scene at that time, the device can find out which word set a word is input from at the current time. Furthermore, recognition processing of the word which is input at that time can be performed.

Therefore, as the beginning of the conversation, for example, if speaker number 1 first speaks "alarm" to the device as one of the registration words, sound analysis for "alarm" can be performed, and the speaker is specified on the device side by the pitch cycle information which is thereby obtained. In this case, it is determined that the inputting speaker is speaker number 1, and the sound spoken by the user is recognized as "alarm" as the speech recognition processing is performed using the registration word data RD1 for speaker number 1 with respect to the inputting sound.

Thus, as the inputting speaker inputs a registration word, the device determines which speaker is the inputting speaker, and recognition is performed for a registration word. Furthermore, if the sound input thereafter is a word other than a registration word (word other than the words in the word set W1), the speech recognition operation is performed without determining the speaker.

For example, when the current device side operation scene is a scene in which a registration word is recognized, after the recognition processing of the registration word is completed, if a scene where word set w2 or w3 (assume word set w2) is recognized is set as the next scene, for speech recognition processing through speaker adaptation, the recognition of the word set w2 is performed using the quantized code book VQ1 of the speaker number 1, the first specific speaker group code book CB1, and the first specific speaker group sound model data MD1 (sound model data corresponding to the word set w2).

Figure 4:
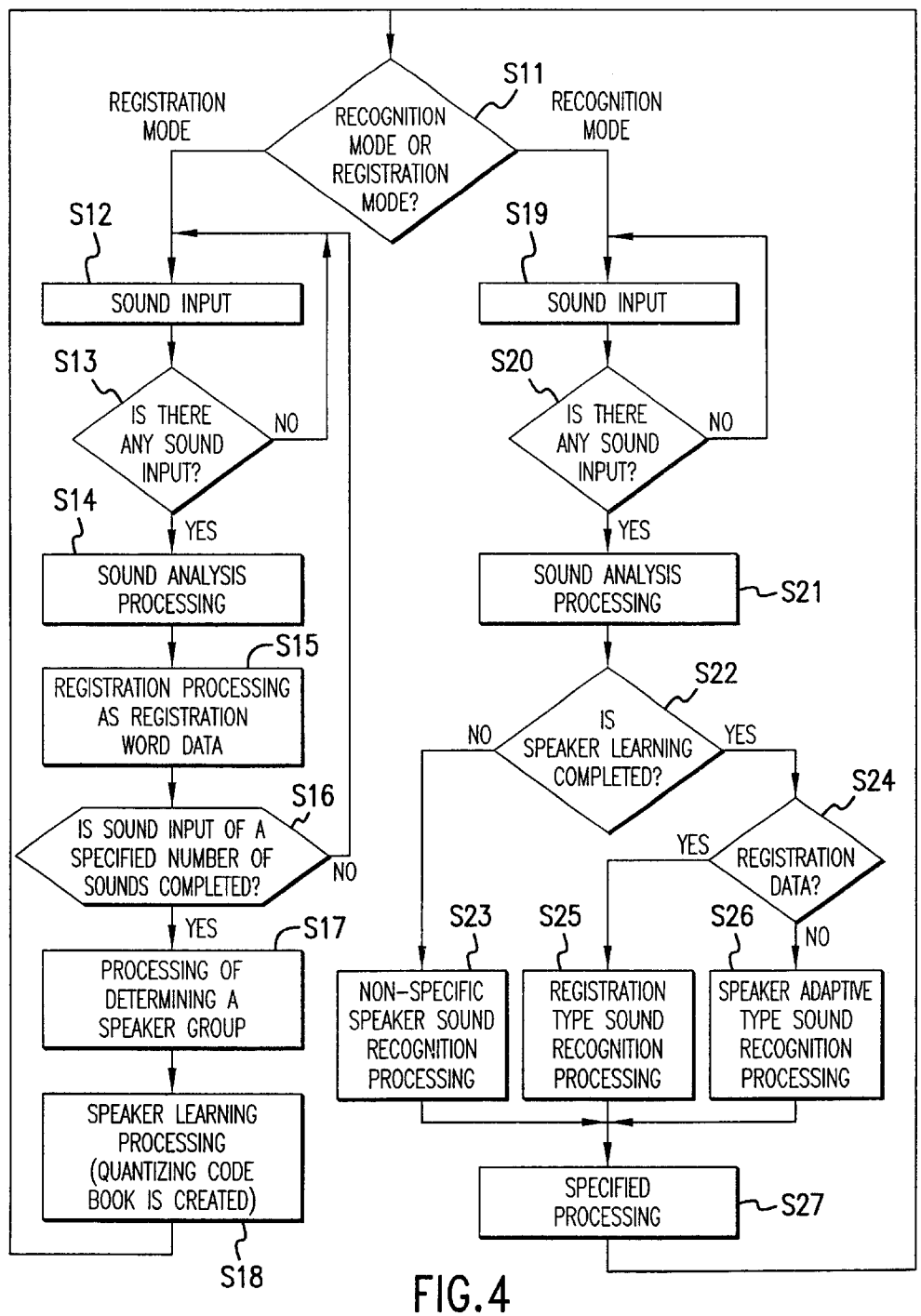
FIG. 4 is a flowchart explaining the processing procedure for a specific speaker and explaining the entire processing procedure of the speech recognition processing which can perform the speaker learning processing.

FIG. 4 is a flowchart explaining the overall processing procedure of the speech recognition processing which can perform the speaker learning processing explained above. Furthermore, the flowchart shown in FIG. 4 shows a processing procedure where the speaker is limited to one certain speaker.

In FIG. 4, first of all, it is determined whether the device is in the recognition mode or a registration mode (step s11). When it is the registration mode, sound inputting is performed for the registration words spoken by the speaker (step s12) and the device determines whether the sound inputting has been performed (step s13). If sound inputting has been performed, sound analysis of the sound which has been input is performed (step s14), and the input sound data is registered as registration word data (step s15).

Additionally, the device determines whether the input of the sound data has been completed with respect to the words to be registered (step s16). If it has been completed, it is determined to which speaker group the sound data of the input sound belongs (step s17). The speaker learning processing described above is performed (inputting speaker code book is created and the quantized code book is ultimately created) (step s18).

Meanwhile, when it is determined that it is the recognition mode in step s11, the sound spoken by the speaker is input (step s19), and it is determined whether sound input has been performed (step s20). If the sound input has been performed, sound analysis is performed by detecting the sound divisions of the input sound (step s21).

Furthermore, it is determined whether speaker learning processing is performed (step s22). If the speaker learning processing is not performed, speech recognition processing is performed by non-specific speaker speech recognition (specific speaker group sound model data 92 in this embodiment (it is specific speaker group sound model data which has been prepared corresponding to the input speaker, which is first specific speaker group sound model data if the input speaker is the speaker number 1)) (step s23), and the processing of step s24 and after is performed, if the speaker learning processing is performed.

In step s24, it is determined whether the sound data for the input sound is registration word data. If it is registration word data, as a registration type of speech recognition processing, the speech recognition processing is performed using the registration word data 101 (registration word data created by the sound of the input speaker at this point and if the inputting speaker is speaker number 1, it is registration word data RD1 for speaker number 1) (step s25).

Furthermore, when it is not registration word data, as a speaker adaptive type of speech recognition processing, and sound recordation processing is performed using a quantized code book (if the inputting speaker is speaker number 1, quantized code book VQ1 for the speaker number 1 is used) which has been created based upon the sound of the inputting speaker, a specific speaker group code book (if the inputting speaker is speaker number 1, the first specific speaker group code book CB1 is used), and specific speaker group sound model data (if the inputting speaker is speaker number 1, the first specific speaker group sound model data MD1 is used) (step s26).

Incidentally, in the case of this device, as described earlier, recognizable words include a plurality of word sets, such as word sets w1, w2, and w3. As described earlier, the device knows what word set is currently input. For example, the device knows what scene is current, such as knowing that after the scene where the word set w1 (registration word) is input is completed, the scene where the word set w2 (hour unit such as "one o'clock" and "two o'clock") is input is current.

Therefore, in step s24 described earlier, the determination as to whether the sound data for the input sound is registration word data depends on what scene is current. If it is a scene where a registration word is input, the word data to be input is assumed to be registered data, and corresponding processing is performed.

In addition, when the speech recognition processing is completed, predetermined processing is performed based upon the recognition result (step s27).

Figure 5:
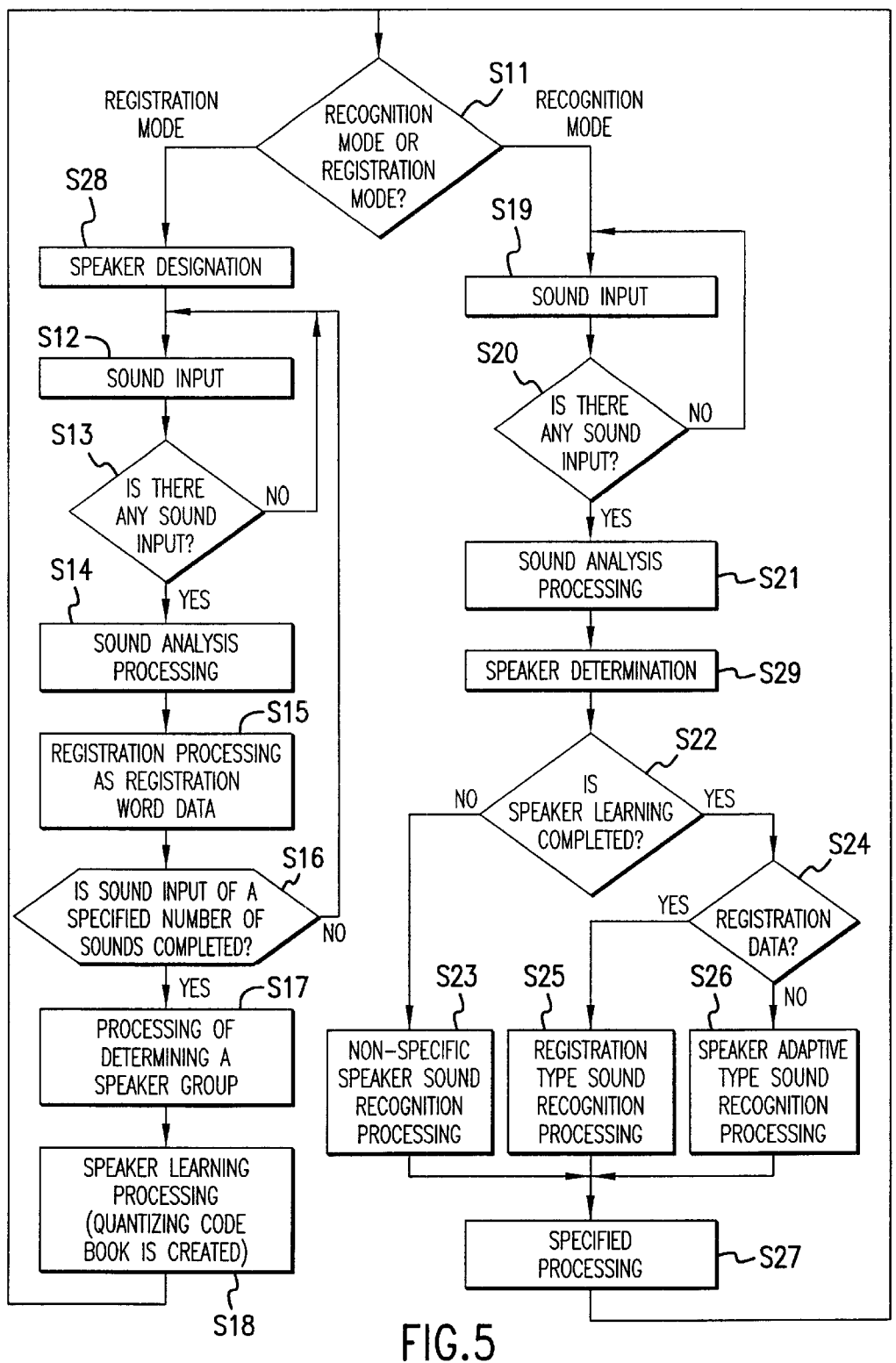
FIG. 5 is a flowchart explaining the processing procedure for a plurality of speakers and explaining the entire processing procedures of speech recognition processing which can perform the speaker learning processing.

Furthermore, the processing shown in FIG. 4 is a process for a specific speaker. However, for example, if a plurality of speakers such as speaker numbers 1, 2, and 3 exist as described earlier, as shown in a flowchart of FIG. 5, in the case of the registration mode, a step s28 of performing speaker designation (for example, designation of speaker numbers 1, 2, and 3) before the sound input step s12 is added. Therefore, in this case, as shown in FIG. 1, for the registration word data, registration word data RD1, RD2, and RD3 are created for the speaker numbers 1–3. For the quantized code books, quantized code books VQ1, VQ2, and VQ3 are created for speaker numbers 1–3.

Meanwhile, in the case of the recognition mode, after the sound analysis processing of step s21, speaker determination processing (step s29) which determines which speaker is the inputting speaker among, for example, speaker numbers 1, 2, and 3, is added.

Furthermore, in the case of registration words, the speech recognition processing here is performed by using one of the registration word data RD1, RD2, and RD3 for speaker numbers 1, 2, and 3 which have been created based upon the sound data of speaker numbers 1, 2, and 3. If it is not a registration word, then speech recognition is performed using one of the following groups, the quantized code book VQ1 for speaker number 1, the first specific speaker group code book CB1 and the first specific speaker group sound model data MD1, quantized code book VQ2 for speaker number 2, the second specific speaker group code book CB2 and the second specific speaker group sound model data MD2, or the quantized code book VQ3 for speaker number 3, the third speaker group code book CB3 and the third specific speaker group sound model data MD3.

In addition, the processing in the recognition mode explained above is the processing when a registration word is registered. However, the same recognition processing is possible even when a registration word is not registered. In this case, the registration word data RD101 is not created, so the speech recognition is performed using the specific speaker group sound model data 92.

Figure 6:
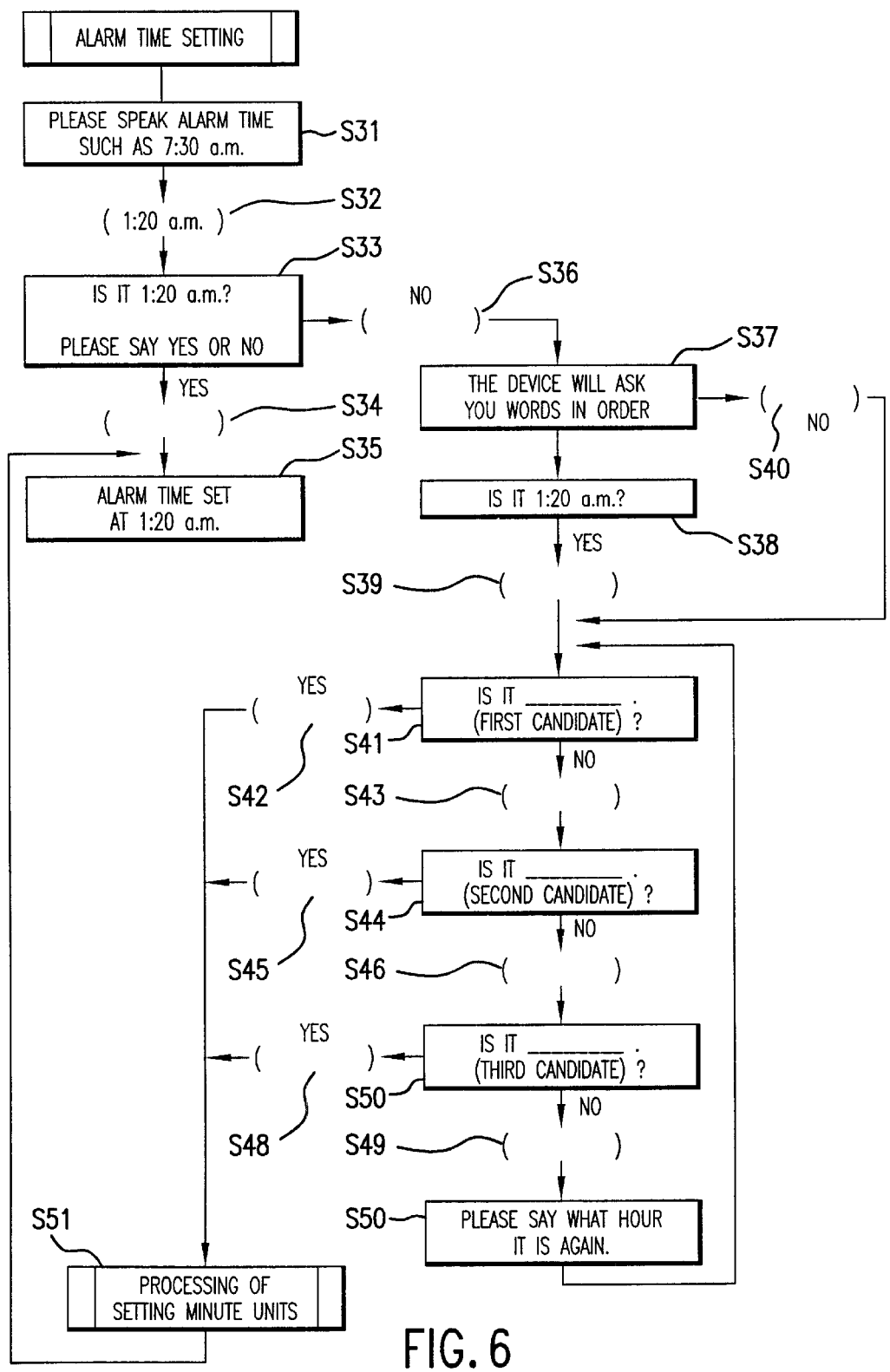
FIG. 6 is a state flowchart explaining the recognition processing of three continuous words ("a.m.", "1 o'clock", "20 minutes") in an embodiment of this invention.

A conversation example between the speaker and the device when alarm time setting is performed is next explained with reference to the flowchart of FIG. 6. In FIG. 6, the speaker content within the parenthesis is the content of the words spoken by the speaker who uses the device. Furthermore, the device prompts the speaker to speak by listing content examples to be spoken such as "Please speak the alarm time such as a.m., seven o'clock, thirty minutes" (step s31). By so doing, the speaker (speaker number 1 here) speaks "a.m.", "one o'clock" and "twenty minutes" as a desired time to be set (step s32).

In the conversation content here, three words are considered as one set, such as "a.m.", "one o'clock" and "twenty minutes", and the words are continuously spoken with small intervals between each word. Furthermore, on the device side, speech recognition is continuously performed with respect to the respective words. As the recognition result, the device responds to the speaker by saying "Is it 1:20 a.m.? Please answer yes or no" (step s33).

If this recognition result is correct, speaker number 1 responds to the device by saying "yes" (step s34). The device then speaks a conversation content such as "The alarm time is set at 1:20 a.m." (step s35). On the other hand, if the recognition result is incorrect, speaker number 1 responds to the device by saying "no" (step s36), and the device responds to the speaker by saying "The device will ask you in order" (step s37).

Furthermore, first of all, the device speaks to the speaker by asking "Is it a.m.?" to confirm whether it is "a.m." or "p.m." (step s38).

In response, speaker number 1 says "yes" if a.m. is correct (step s39). If it is incorrect (if it is not a.m.), the speaker responds to the device by saying "no" (step s40). Because "a.m." and "p.m." are mutually exclusive, if speaker number 1 responds to the device by saying "no", the other word can be confirmed. That is, the first inquiry from the device is "a.m.", and the speaker responds to the device by saying "no", "p.m." is confirmed.

In addition to "a.m." and "p.m.", for example, if "noon" is added, among "a.m.", "p.m." and "noon", if one of them needs to be confirmed, for example, "noon" is confirmed if the device states. "Is it a.m.?", the speaker says "no", the device says "Is it p.m.?", and the speaker says "no". Thus, if there are only three words, by repeating the response of "yes" or "no" from the speaker two to three times, it is possible to confirm a desired word in a short period of time.

When the confirmation of "a.m." or "p.m." is thus performed, next, the "hour" unit is confirmed. In this case, the word which has been input by the speaker number 1 is "one o'clock". In response to this, for example, if the device speaks "Is it one o'clock?" as a first candidate in step s41 among first through nth recognition candidates for "one o'clock", speaker number 1 responds to the device by saying "yes" (step s42), and if "one o'clock" is confirmed, the confirmation processing of minute unit begins (step s51).

However, for example, if "seven o'clock" is output from the device side in step s41 as the first candidate, speaker number 1 responds to the device by saying "no" (step s43). By so doing, the second candidate is output from the device (step s44), and, for example, if "eight o'clock" is output as the second candidate, if it is correct, speaker number 1 responds to the device by saying "yes" (step s45). If it is incorrect, speaker number 1 responds to the device by saying "no" (step s46).

Here, because the response is "no", for example, the device outputs "one o'clock" as a third candidate (step s47). If it is correct, the speaker number 1 responds to the device by saying "yes" (step s48). If it is incorrect, the speaker number 1 responds to the device by saying "no" (step s49). Here, because the speaker number 1 responds to the device by saying "yes", "one o'clock" is confirmed at that point and the confirmation processing of the minute unit (step s5 1) begins.

Furthermore, if the response is "no" for the third candidate, the device prompts speaker number 1 by saying, for example, "Please say what time it is again." Thus, the device asks the speaker to input the sound of "hour" unit (step s50). By so doing, the speaker number 1 speaks the hour unit again ("one o'clock" in this case), and the program returns to step s41.

Additionally, when the sound input is performed with respect to "hour" unit and is recognized, the words ("seven o'clock", "eight o'clock", or the like in the case discussed earlier) denied by saying "no" are removed from the recognition candidates.

Furthermore, the "minute" unit can be performed in the same processing as steps s31–s50 explained in "hour" unit. Furthermore, when it is finally confirmed, the device announces "the alarm time is set at 1:20 a.m." (step s35).

This type of processing can be performed in the same manner for the current time setting, in addition to the alarm setting.

Additionally, when the first candidate is rejected by the speaker in the processing described above, for example, the device can speak in accordance with an order of numbers which express time, and which is not related to the recognition candidate order, instead of speaking the recognition candidate order such as the second candidate and the third candidate, for example, when "one o'clock" is rejected, the device can speak times in the order of two o'clock", "three o'clock", etc.

By performing this type of processing, in the case of time setting, the speaker can continuously speak sounds such as "a.m.", "o'clock", and "minute" as one group. By so doing, the sound inputting operation for the time setting can be simplified. Furthermore, if the series of sounds is correctly recognized, the time setting is completed at that time. If it is incorrect, words are confirmed one by one until the sound is correctly recognized. Therefore, the correct time setting can ultimately be performed, and the time setting can be performed reliably and conveniently.

In addition to time, this type of processing which recognizes continuous words can be broadly applied to cases where sound formed of a plurality of words which is continuously spoken with small intervals between words is recognized.

Figure 7:
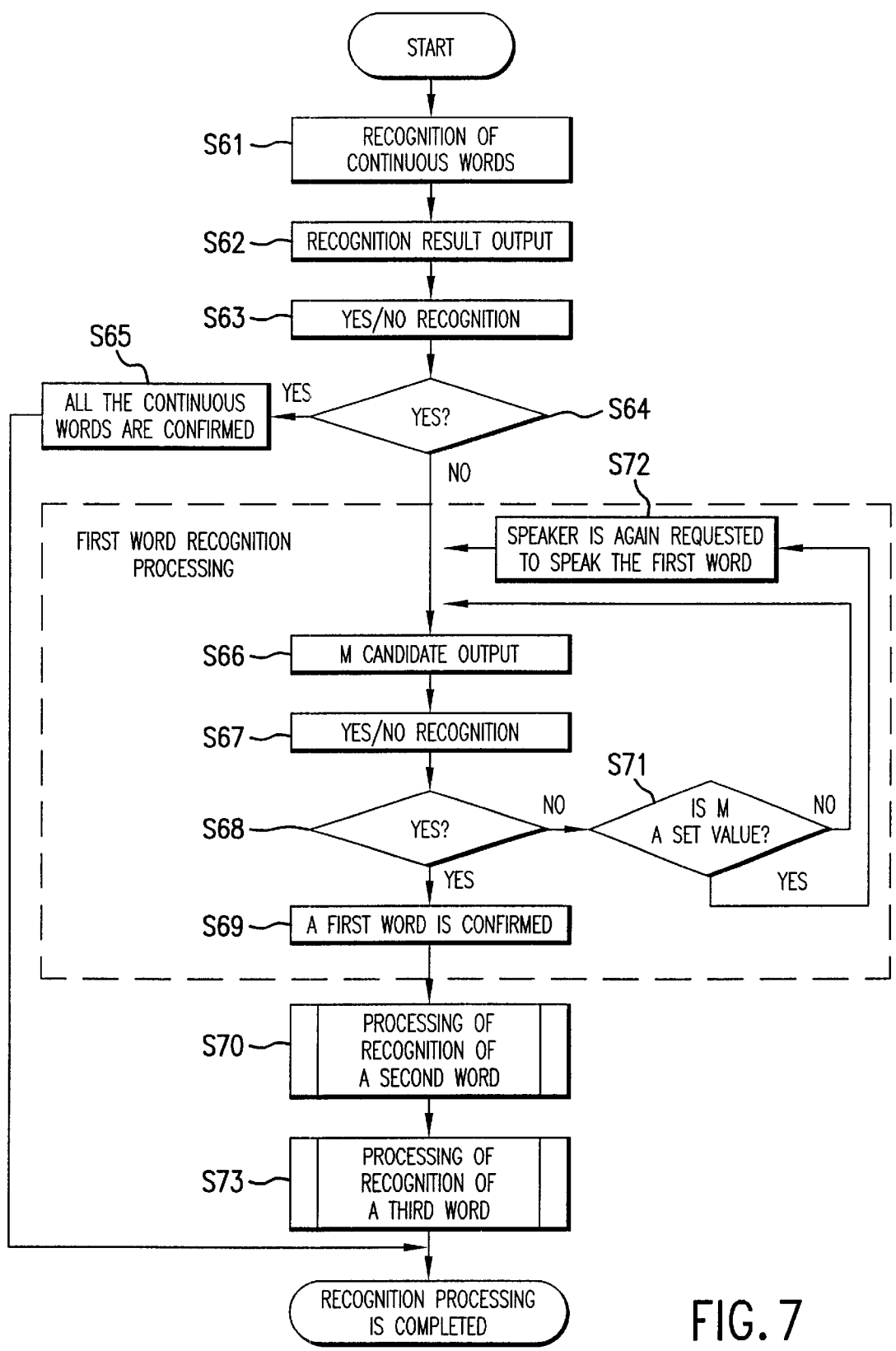
FIG. 7 is a flowchart explaining the processing procedure when the recognition processing of three words shown in FIG. 7 is applied as a general continuous word recognition processing.

FIG. 7 is a flowchart explaining a processing procedure when sound formed of a plurality of words, i.e., n words from first through nth, is continuously spoken with small intervals between words is recognized (defined as continuous word recognition here). The processing procedure shown in FIG. 7 is briefly explained. Here, as n continuous words, there are three words (a first word, a second word, and a third word). Furthermore, when recognition for a first word, a second word, and a third word is respectively performed, m recognition candidates are output, with m having the values from 1 through 3 here.

In FIG. 7, first of all, recognition is performed for continuous words consisting of a plurality of words spoken by the speaker (step s61). Furthermore, the recognition result is output (step s62), and the recognition of "yes" or "no" is performed from the speaker with respect to the recognition result (step s63). Here, if the response of the speaker is "yes" (step s64), the recognition result is confirmed for all the continuous words (step s65), and the recognition processing is completed at this point.

Meanwhile, if the response of the speaker is "no", recognition processing of the first word begins. The recognition processing of this first word outputs an mth candidate (m=1 here) (step s66), and "yes" or "no" of the speaker is recognized (step s67). Here, if the response of the speaker is "yes" (step s68), the first candidate is confirmed as the first word (step s69), and the processing for the second word begins (step s79).

Meanwhile, if the response of the speaker is "no", it is determined whether m is a set value (the set value is m=3 in this case) (step s71). Here, because it is not yet the set value, the processing returns to step s66, and the second candidate is output as m=2 this time.

Furthermore, "yes" or "no" of the speaker is recognized (step s67). Here, if the response of the speaker is "yes" (step s68), the second candidate is confirmed as this first word (step s69), and the processing for the second word begins (step s70).

Furthermore, if the response of the speaker is "yes", the determination of step s71 is performed.

Thus, if the response of the speaker is "yes", the first word is confirmed by the recognition candidate at that point. However, if the response of the speaker is "no", the same processing is performed for the following recognition candidate. Furthermore, in this case, if the word is not correctly recognized for the third candidate, the device requests the speaker to speak the first word one more time (step s72). The speaker then repeats the same operation for the first word spoken by the speaker.

Additionally, as explained in the example of FIG. 6 described earlier, the sound input is performed as the speaker speaks the first word again, and when the sound is recognized, the words which have already been rejected by "no" are removed from the recognition candidates.

When the recognition processing for the first word is thus completed, next, the recognition processing (step s70) for the second word begins. When the recognition processing for the second word is completed, next, the recognition processing for the third word (step s73) begins. Furthermore, the recognition processing for the second and third words is the same as the recognition processing of the first word, so the explanation is omitted here.

Incidentally, when the sound inputting operation as described above is performed, the distance between the speaker and the sound inputting part (microphone) of the device side is an important factor in terms of the recognition capability. Here, in this embodiment, according to the situation of the sound inputting operation of the speaker, the sound inputting gain of the sound inputting part, that is, the sound inputting gain of the microphone amplifier 2, is changed and controlled. This controlling, in addition to the controlling of the various processing described earlier, is performed in the controller 5. Hereafter, this controlling is explained.

The sound inputting gain (hereafter referred to as gain) controlling of this microphone amplifier 2 determines the scene type in which the sound inputting is being performed, and the gain is controlled according to the scene.

For example, it is determined whether a sound which requires particularly high recognition percentage in the operation of device is input, or some other sound. If sound which requires particularly high recognition percentage in the operation of the device is input, controlling is performed such that the sound inputting gain can be minimized, compared to a scene where some other sound is input.

Specifically, when the characteristic amount of the sound is mutually similar between a plurality of words is input, and the sounds of the words are easily misrecognized, when the word registration is performed, and when the speaker learning is performed, controlling is performed such that the sound inputting gain can be minimized.

When sounds for words which are easily misrecognized is input, in the case of this device, the alarm time or the current time is set, consider the scene where the time inputting (a.m., o'clock, and minute) is performed. With respect to this type of time setting, there are many sounds in which the characteristic amount of the sound is similar and is easily misrecognized, such as "five o'clock" and "nine o'clock". Furthermore, the time setting must be accurately performed.

Therefore, when this type of sound inputting is performed, the gain of the microphone amplifier 2 is minimized, and the speaker approaches the microphone and speaks words.

Meanwhile, in a scene where the speaker calls out to the device, the gain can be maximized and sound input is possible even if the speaker is distant from the device. This is convenient when conversation is carried out between the speaker and the device when the speaker is distant from the device.

In this type of scene where the gain is maximized, words (words which belong to the word set w1) which have been registered such as "good morning", "I'm home", "good night", "o'clock", and "alarm" are input. In this case, compared to the time information (word sets w2 and w3) described above, the words input in this type of scene are not easily misrecognized among other words which belong to the same word set W1. In this case, there are also not many recognition target words because there are only several words. Furthermore, because the speaker casually speaks to the device, it is preferable to use a method in which the words can be input at a distance from the device by maximizing the gain.

Thus, depending upon the scene type where the respective word is input, a sound inputting gain is set which is appropriate to the scene.

When sound for a word that is easily misrecognized is input, when word registration is performed, and/or when speaker learning is performed, as described earlier, the gain of the microphone amplifier 2 is minimized, and the speaker speaks near the microphone 1. Therefore, the distance between the speaker and the microphone 1 does not vary much from speaker to speaker, and there are many cases where the distance is virtually the same. Therefore, the S/N ratio is improved, the dynamic range is minimized, and the conversation content in this situation can be recognized with a high recognition percentage.

Thus, the gain of the microphone amplifier 2 is controlled depending upon the situation where the sound input is performed. In order to perform the sound input in response to the situation, some sort of notification is sent from the device side. As the notification content, for example, "Please come close to the microphone and speak", "Please speak loudly", or "Please speak softly" can be listed, and these contents can be output from the device side.

The controller 5 can find out what type of sound input is being performed with respect to a current sound input (for example, whether the speaker is simply calling out to the device, a registration word is being input, time setting is being performed, or the like). Therefore, according to the situation, it is possible to change and control the gain of the microphone amplifier 2, and to output content that causes the speaker to speak according to the gain of the microphone amplifier 2.

For example, when sound for the word that is easily misrecognized is input, when word registration is performed, and/or when the speaker learning is performed, the gain of the microphone amplifier 2 is minimized, and content such as "Please come close to the microphone and speak again" is output from the device. By so doing, the speaker naturally approaches the microphone and speaks. By so doing, the S/N ratio is improved and the dynamic range is minimized, so the recognition capability can be improved.

Figure 8:
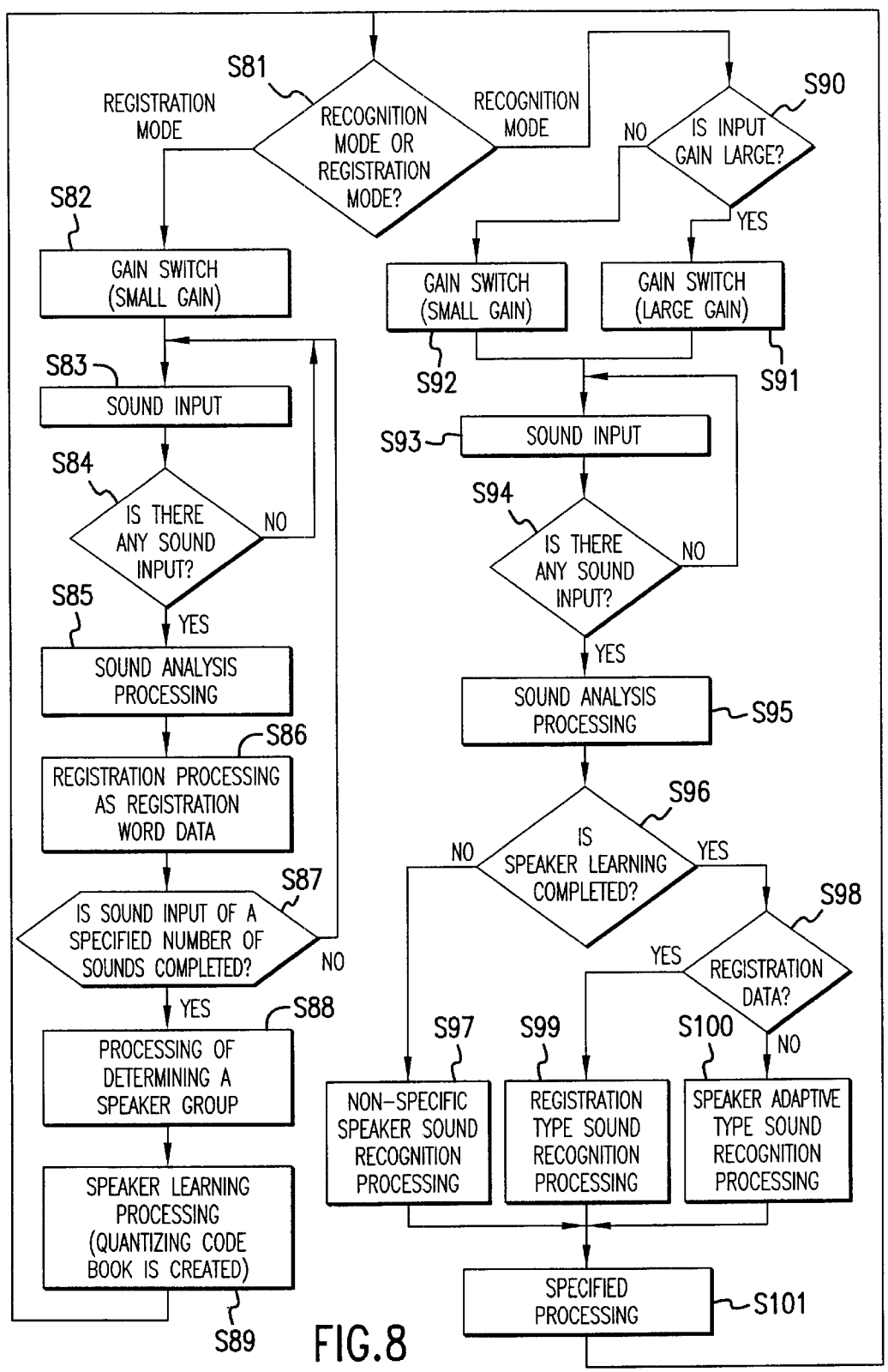
FIG. 8 is a flowchart explaining the processing procedure including a gain change of a microphone amplifier according to the situation of the sound inputting operation of the speaker.

FIG. 8 is a flowchart explaining an example of performing control to change the gain of the microphone amplifier 2 according to the situation of the sound inputting operation of the speaker explained above. Here, the example is explained of changing the gain when the processing of FIG. 4 described above is performed.

In FIG. 8, it is determined whether it is the recognition mode or the registration mode (step s81). In this determination, if it is the registration mode, the gain change is performed so that the gain of the microphone amplifier 2 is minimized (step s82), and the sound input is performed with the changed gain (step s83). Step s83, which performs this sound inputting, through step s89 of the speaker learning processing is the same as step s12 of FIG. 4, which performs the sound inputting, through step s18 of the speaker learning processing, so the explanation is omitted here.

Meanwhile, when it is the recognition mode, the gain of the microphone amplifier 2 is changed according to the scene. For this change, it is determined whether the scene where the sound inputting is performed is a scene where the gain is maximized (step s90). In the case of a scene where the gain is maximized, a gain change is performed so that the gain of the microphone amplifier 2 is to be maximized (step s91). In the case of a scene where the gain is to be minimized, a gain change can be performed so that the gain of the microphone amplifier 2 is minimized (step s92).

Furthermore, a scene where the gain is to be maximized in step s90 is a scene where sound inputting such as an inquiry is performed. Meanwhile, a scene where the gain is to be minimized is a scene where a registration word is input, or cases such as the time input (a.m., o'clock, and minute) in the case of alarm setting and the current time setting, where the possibility of misrecognizing is high and particularly high recognition percentage is desired.

Thus, according to the scene at that time, gain setting is performed and the sound inputting is performed (step s93). The sound inputting (step s93) through the specified processing (step s11) is the same as the sound inputting (step s19) of FIG. 4 through the specified processing (step s27), so the explanation is omitted here.

Additionally, when a device receives this type of the command by sound and performs an operation in response to the command, there are many cases when a speaker with low recognition percentage and a speaker with good recognition percentage exist, depending upon the characteristics of the speaker's way of speaking and the sound quality of the speaker.

Thus, for a speaker with a particularly bad recognition percentage, the conversation content is output from the device side in a question-and-answer format. As the speaker listens to the content, he/she operates a button which means affirmative when he/she means affirmative, and operates a button which means negative when he/she means negative. Therefore, the same type of operation can be performed in order to recognize "yes" or "no".

That is, the device outputs candidates one by one in order in a question-and-answer format as the setting information for the information which the speaker would like to set for the device (defined as setting information). Every time one candidate is output, the input of a button which means affirmative for the output candidate, or the input of the button which means negative for the output candidate, is received. When the input of button which means affirmative is received, the candidate is confirmed as the setting information, and when the input of the button which means negative is received, the following candidate is output.

Thus, enabling the input of affirmative or negative by this button operation is to help a speaker with a bad recognition percentage. This is called a help mode here. Hereafter, this help mode is explained.

In the operating part 11 of the device, a negative button BT22 which means negative and an affirmative button BT21 which means affirmative are disposed. That is, when the affirmative button BT21 is pressed by the speaker, the controller 5 determines that it is affirmative. When the negative button BT22 is pressed, the controller 5 determines that it is negative.

Furthermore, in order to carry out the help mode, by simultaneously pressing the affirmative button BT21 and the negative button BT22 for several seconds (approximately 2 seconds) or more in the ordinary recognition mode explained above, for example, the controller 5 detects the status, determines that the setting of the help mode has been performed, and shifts to the help mode. Additionally, the shift to this help mode is not limited to the condition where the affirmative button BT21 and the negative button BT22 are simultaneously pressed for several seconds or more, and other methods are also acceptable.

When the help mode thus begins, the device does not perform the speech recognition operation, but detects whether the speaker has pressed the negative button BT22 or the affirmative button BT21, and the corresponding processing proceeds.

Figure 9:
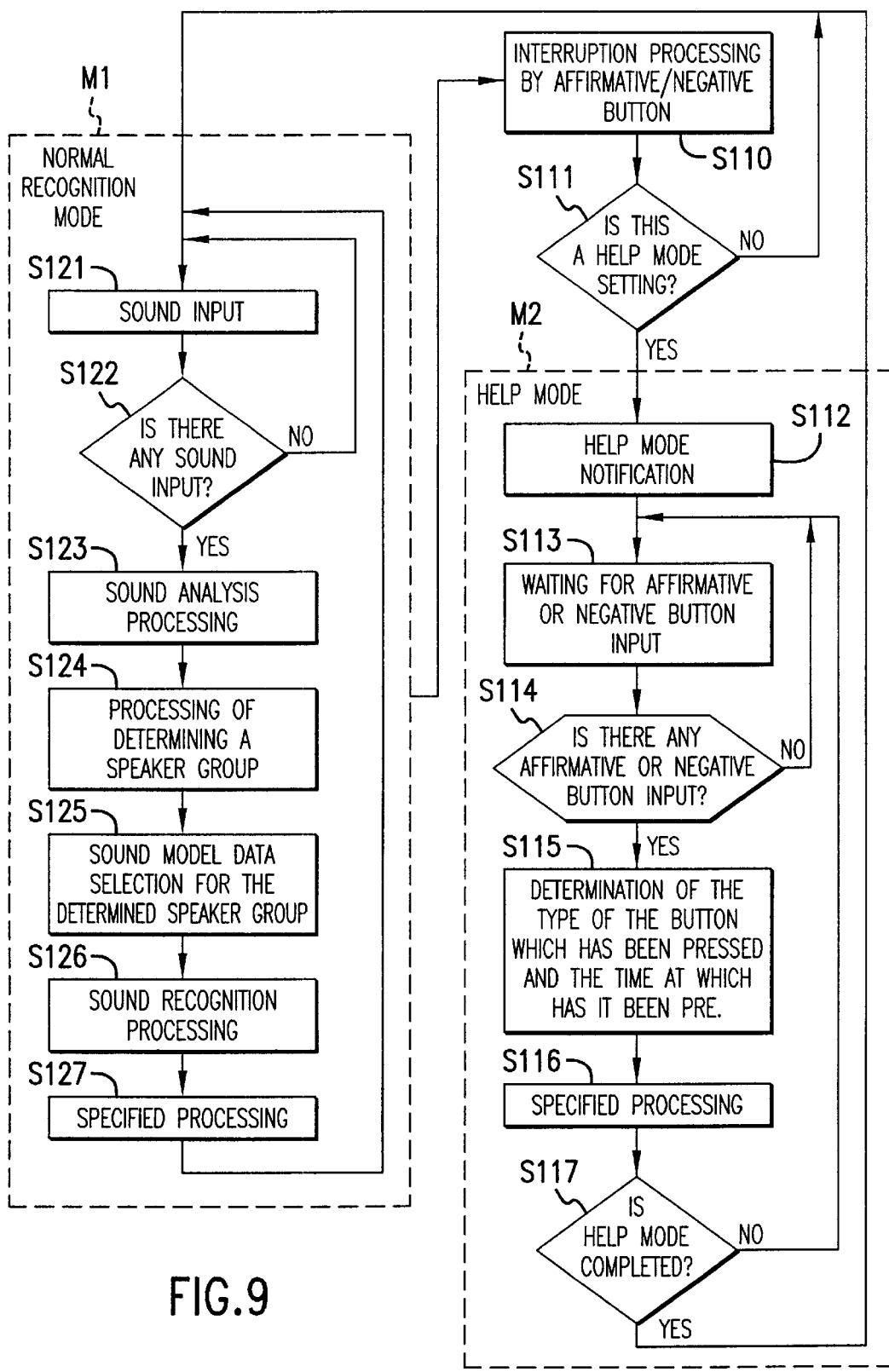
FIG. 9 is a flowchart explaining a speech recognition processing procedure provided with a help mode.

FIG. 9 is a flowchart explaining the recognition processing when the help mode is provided. In FIG. 9, M1 is a processing procedure during the ordinary recognition mode, M2 is a processing procedure during the help mode, and the shift from an ordinary recognition mode M1 to the help mode M2 is performed by a button interruption (step s110) in which the affirmative button BT21 and the negative button BT22 are simultaneously pressed for several seconds (approximately 2 seconds) or more. Furthermore, the processing from the sound input (step s121) in the ordinary recognition mode M1 to the specified processing (step s127) shown in FIG. 9 is the same processing as steps s1–s7 shown in FIG. 2, so the explanation is omitted here.

Now, assume that recognition is being performed in the ordinary recognition mode, and that, in this ordinary recognition mode, interruption by the affirmative button BT21 and the negative button BT22 occurs (step s110).

By so doing, it is determined whether the setting of the help mode has been performed (step s111). If it is the setting of the help mode, the status of the help mode is notified to the speaker (step s112). Furthermore, for the setting of the help mode by step s112, here, it is determined whether the affirmative button BT21 and the negative button BT22 are simultaneously pressed for several seconds (approximately 2 seconds) or more.

When the shift to the help mode M2 is thus performed, the device is placed in a state of awaiting input of the affirmative button BT21 or the negative button BT22 (step s113). It is determined whether the affirmative button BT21 or the negative button BT22 is pressed (step s114), and whether the pressed button is the affirmative button BT21 or the negative button BT22, and/or how long the pressed state continues (step s115). The corresponding specified processing is then performed (step s116).

For example, the candidates for the information which the speaker wants to set for the device are output one by one from the device in a question-and-answer format to ask the speaker whether the input is correct. Every time one candidate is output, the input of the affirmative button BT21 or the negative button BT22 is received with respect to the output candidate. When the input of the affirmative button BT21 is received, the candidate is confirmed as the setting information, and when the input of the negative button BT22 is received, the following candidate is output. Furthermore, the specific processing content is explained later.

Next, it is determined whether the help mode is completed (step s117). If it is not completed, the processing returns to step s113. If it is completed, the processing returns to the ordinary recognition mode M1.

Figure 10:
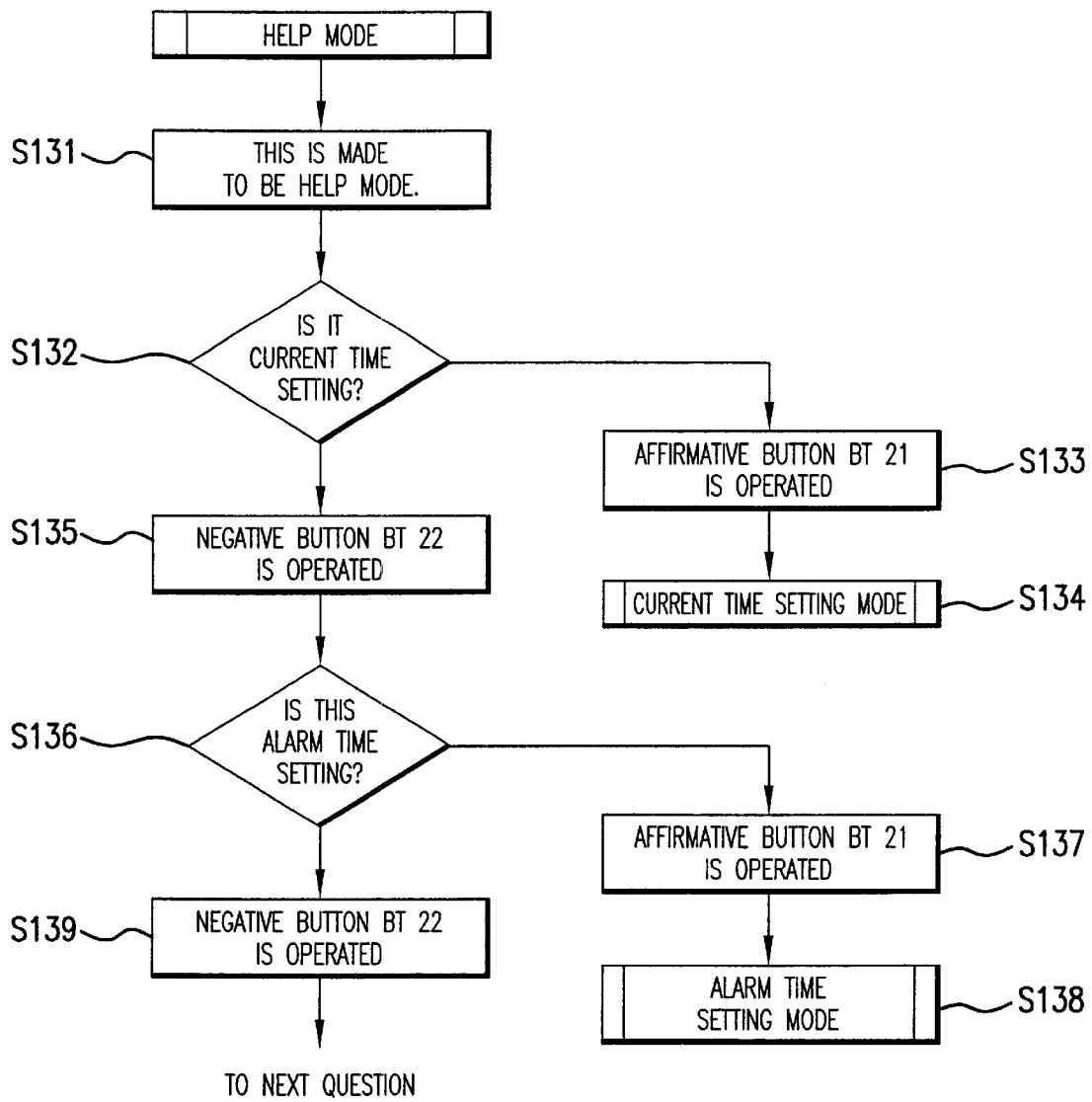
FIG. 10 is a state flowchart explaining the help mode (the input mode of "yes" and "no" by a affirmative button and a negative button) in an embodiment of this invention with respect to the speech recognition processing.

The following explains a specific operation example with reference to a state flowchart of FIG. 10. Furthermore, the operations within parentheses in FIG. 10 are operations performed by a speaker.

First of all, the device notifies the speaker of the help mode such as "The help mode is now active" (step s131). Subsequently, the device speaks the information which the speaker would like to set for the device, such as "Is this current time setting?" (step s132). When the speech content is affirmed by the speaker, the affirmative button BT21 is pressed (step s133), and by so doing, the current time setting mode begins (step s134).

Furthermore, if it is not the current time setting, the negative button BT22 is pressed (step s135). When this happens, the device speaks content such as "Is this alarm time setting?" (step s136). When the speech content is affirmed by the speaker, the affirmative button BT21 is pressed (step s137), and by so doing, the alarm time setting mode begins (step s138). Furthermore, if it is not the alarm time setting, the negative button BT22 is pressed (step s139).

Thus, with respect to the one-by-one questions from the device, the speaker presses the affirmative button BT21 or the negative button BT22 instead of responding to the device by saying "yes" or "no". Through this, the device proceeds with the processing according to the button operation. The question content includes, for example, "Would you like to perform a registration word input?" in addition to the two question contents explained above, but description concerning the processing for such other contents is omitted in FIG. 10.

Furthermore, if the affirmative button BT21 and the negative button BT22 are erroneously operated, the processing returns to the previous question by instantly simultaneously operating the affirmative button BT21 and the negative button BT22.

The current time setting mode (step s134) mentioned earlier is briefly explained. For the current time setting using the affirmative button BT21 or the negative button BT22, the device asks whether it is "a.m." If the speaker presses the affirmative button BT21 in response, a.m. is confirmed, and if the negative button BT22 is pressed, "p.m." is confirmed.

After a.m. or p.m. is confirmed, the device first asks a question such as "Is it one o'clock?". If the hour unit which the speaker would like to set is "one", the affirmative button BT21 is pressed, and one o'clock is confirmed. Furthermore, if it is not one o'clock, the negative button BT22 is pressed. When this happens, the device asks a question to the speaker such as "Is it two o'clock?". If the hour unit is "two" which the speaker would like to set, the affirmative button BT21 is pressed, and two o'clock is confirmed by so doing. Furthermore, if it is not two o'clock, the negative button BT22 is pressed.

This type of procedure is performed until the hour unit is confirmed. Additionally, when the hour unit is confirmed, the processing of the minute unit begins.

The operation of the minute unit is basically the same as the operation of the hour unit described earlier. Therefore, the explanation is omitted here. However, operation could be troublesome if every minute such as one minute through fifty-nine minutes is spoken one by one, and this is time-consuming. In particular, if the minute unit the speaker would like to set is toward the end of the minute units (for example, fifty-nine minutes), this is very time-consuming.

Therefore, in the case of the minute unit setting mode, it is also acceptable to use a method such that, if the negative button BT22 continues to be pressed, the device outputs a sound such as "10 minutes", (1 second later), "20 minutes", (1 second later) "30 minutes", and so forth. When the device speaks "50 minutes", if the speaker stops the operation of the negative button BT22, the processing returns to the ordinary operation, with a base point of 50 minutes. When the device speaks "51 minutes", the negative button BT22 is pressed. Next, when the device speaks "52 minutes", the negative button BT22 is pressed again. This sort of processing continues until 59 minutes is set by pressing the affirmative button BT21 at "59 minutes".

As explained above, there are cases where time setting can be time-consuming. In order to shorten the time required for setting as much as possible, the input of the affirmative button BT21 and the negative button BT22 is received even during the sound output from the device. In addition, in order to improve the convenience, a setting can be made such that a function corresponding to the way of pressing the affirmative button BT21 and the negative button BT22 (continuous pressing, simultaneous pressing, or the like) is performed, and/or such that instructions on how to use the device are given by sound from the device.

Thus, when the speaker speaks the information which the speaker would like to set for the device (setting information), if the setting information is not correctly recognized by the device, by setting the help mode, candidates for the setting information can be output one by one in order from the device in a question-and-answer format. Every time one candidate is output, if the input of the affirmative button BT21 is received, the candidate is confirmed as the setting information, and when the input of the negative button BT22 is received, the following candidate is output. Therefore, the information which the speaker would like to set for the device can be set by the button operation.

By so doing, even if the sound is not properly recognized due to the characteristics of the speaker's way of speaking and/or the voice quality of the individual speaker, information setting such as the time setting can be sufficiently performed to some degree. Furthermore, it is also possible for the speech impaired to easily perform the time setting.

Incidentally, in the sound clock device in this embodiment explained above, when the current time reaches the alarm time which the speaker sets, until the speaker stops the alarm, the device continues to output the current time. For example, the set alarm time is 1:20 a.m., and if the time reaches that point, the device says "1:20 a.m.", and after one minute passes, the alarm says "1:21 a.m.". Furthermore, after one minute passes, the device says "1:22 a.m." Therefore, the current time can be spoken minute by minute. This operation continues until the speaker stops the alarm. Additionally, the current time can be spoken, for example, per ten seconds instead of per one minute.

Furthermore, when the alarm is spoken, words such as "Hurry and get up!" can be output instead of time only, and/or a combination of words and music.

In addition, as the operation to stop the alarm, there are methods such as, after the time as described earlier is spoken from the device, the speaker can speak some sort of sound, or methods in which buttons are operated, or the like.

When the alarm is stopped by a sound spoken by the speaker, the alarm stops when the level of the sound input by the speaker a specified level or more, and when this level of a specified level or more is of a certain length. Furthermore, at this point, speech recognition is not performed. Additionally, separately from this, it is also possible to stop the alarm only when a specified word, which is predetermined by the speaker, is spoken and the sound is recognized by the device. Furthermore, if the alarm is stopped by a button operation instead of inputting sound, it is possible to provide a special button, but the affirmative button BT21 and/or the negative button BT22 described earlier can be substituted.

Furthermore, when the volume adjustment switch VSW is provided, the alarm can be stopped by turning off the volume adjustment switch VSW.

The volume adjustment switch VSW is a switch which adjusts the volume of the sound output from the device. The sound outputting amplifier 7 is controlled by adjusting the volume adjustment switch VSW through the operating part 11. Therefore, the volume of the output sound can be set. As a specific example of the volume adjustment, for example, it is possible to change and set the output sound, such as at "maximum", "medium" and "minimum". Furthermore, it is also possible to turn "off" so that no sound is output.

If the device with this type of speech recognition function is used at home, this prevents the sound clock from generating unnecessary sound in response to sounds from television and conversations between people in the home. Furthermore, if the volume adjustment switch VSW is turned off, in order to reduce electricity consumption, by stopping the power supply to the surrounding circuitry such as the amplifier, the controller (CPU) 5 can be in a sleep state. Furthermore, when the volume adjustment switch VSW is turned on, the CPU is operated by a CPU interruption, and power is supplied to the surrounding circuitry.

Furthermore, in the embodiment of this invention, a plurality of response contents to the sound input by the speaker can be prepared, and randomly changed and output. This is a system that does not bore the user. For example, a plurality of response contents with which the device responds when the speaker inputs "good morning" is prepared, and a response content among the plurality of response contents for "good morning" can be selected at random and output.

By so doing, the user can be less bored even if he/she uses the device for a long period of time.

Additionally, this invention is not limited to the embodiment explained above, and can be modified in various ways within the scope of the main features of this invention.

As an example, several words are selected as registration words among a plurality of recognizable words, the respective registration words are spoken by the recognition target speaker, and registration word data is created for the respective registration words from the sound data and is saved. When a registration word is spoken by the recognition target speaker, the sound is recognized using the registration word data, and when other recognizable words are spoken, when the processing is realized by recognizing the sound using standard speaker sound model data, in the embodiment described earlier, as shown in FIG. 1, the recognition target speaker can be focused into the area which is set in advanced based upon age and gender. Specific speaker group sound model data 92 (forming first through third specific speaker group sound model data MD1, MC2, and MD3) is created from the sound data of many non-specific speakers who belong to the area, and is saved as standard speaker sound model data. However, the invention is not limited to this example, and as shown in FIG. 11, it also applies to cases where conventionally-used standard speaker sound model data, corresponding to all types of speakers, is used.

Figure 11A:
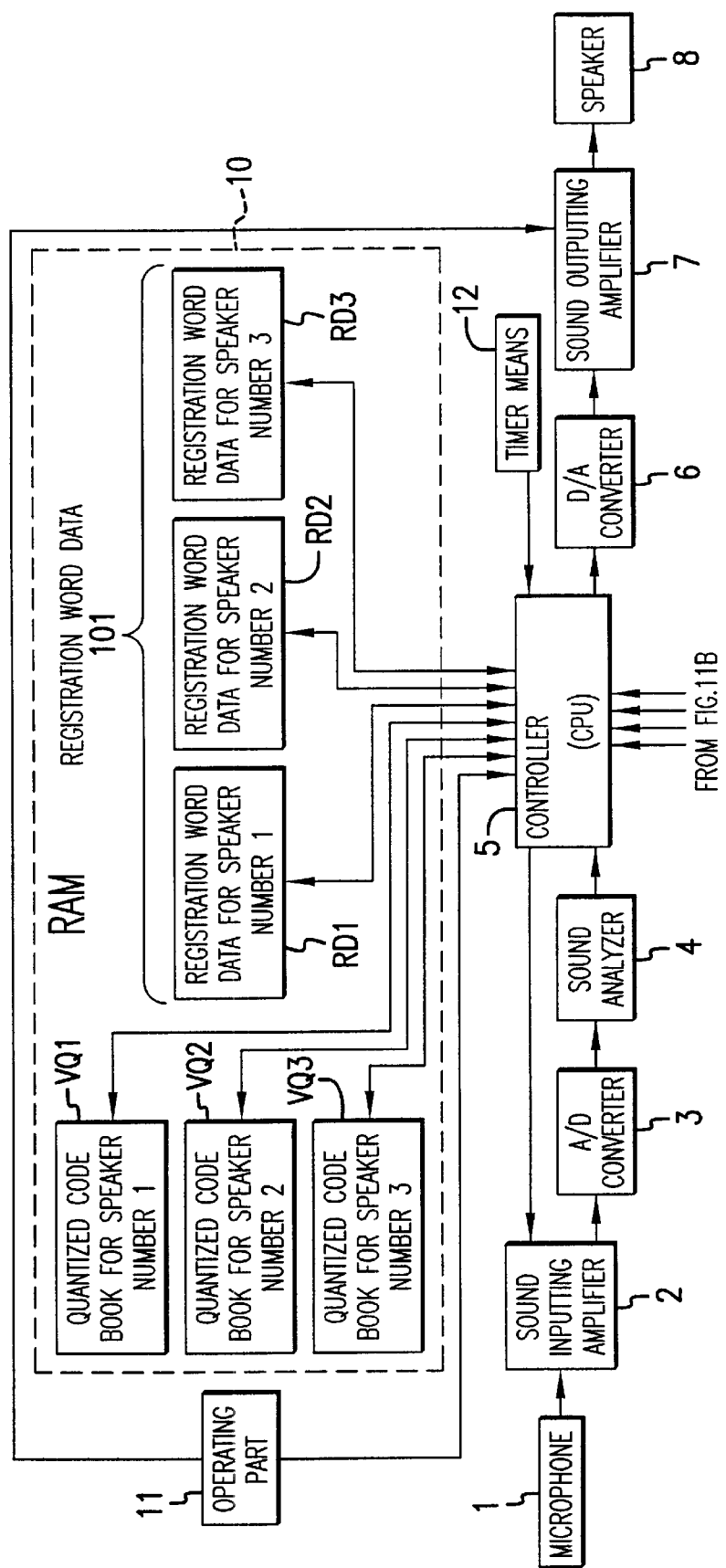
FIG. 11 is a block diagram explaining the structure of another embodiment of the speech recognition device of this invention.
Figure 11B:
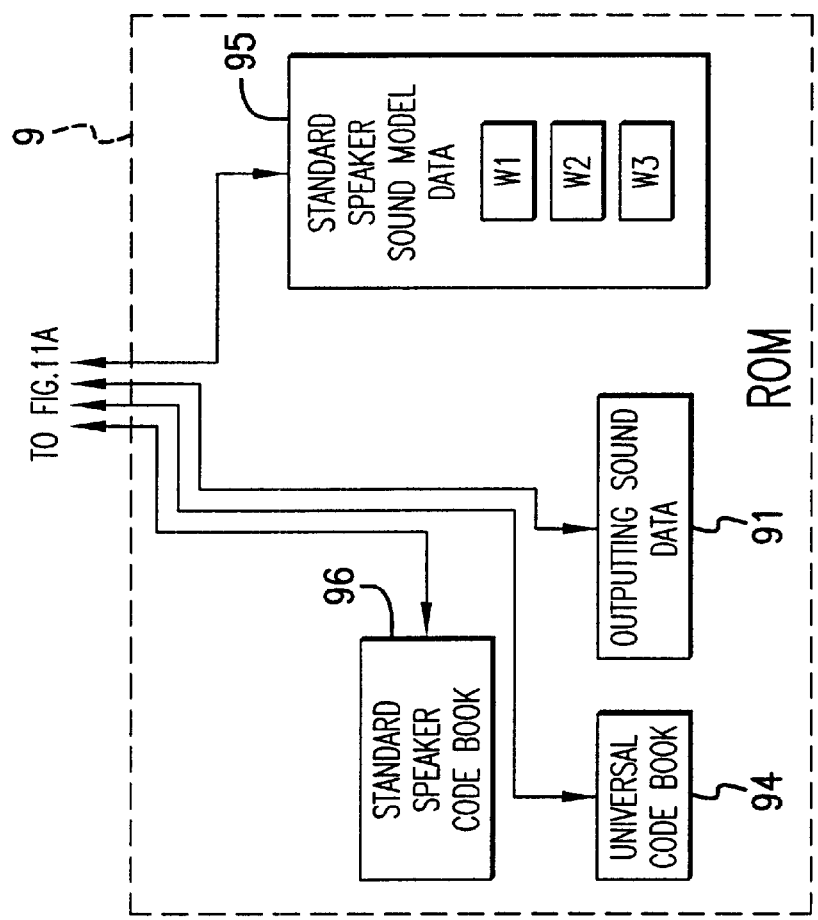

As described earlier, the standard speaker sound model data 95 shown in example of FIG. 11 is not sound model data corresponding to a specific speaker group, but is standard speaker sound model data corresponding to all ranges of speakers. Along with this, the first through third specific speaker group code books CB1, CB2, and CB3 shown in FIG. 1 become standard speaker code books 96 which have been created based on the standard speaker sound model data 95.

Other processing procedures are the same as in the case of FIG. 1, so the explanation is omitted here.

Even in this type of structure, the basic processing which this invention performs is possible. That is, when several words are selected as registration words among a plurality of recognizable words, a recognition target speaker speaks the respective registration words, the registration word data RD1, RD2, and RD3 for the respective registration words is created from the sound data and is saved in RAM 10, and when a registration word is spoken by a recognition target speaker, the sound is recognized using the registration word data RD1, RD2, and RD3, and if other recognizable words are spoken, the sound is recognized using the standard speaker sound model data 95.

In addition, needless to say, the sound clock shown in the above-described embodiment can also have various functions as explained in the embodiment described earlier. However, these functions are not all necessary. Therefore, for the various switches and operating buttons disposed in the operating part 11, it is only necessary to provide the buttons necessary to activate the functions. Furthermore, various processing contents explained in the embodiment described earlier are not limited to the contents explained in the embodiment. For example, as the speaker learning processing, in the embodiment described earlier, the quantized code books VQ1, VQ2, and VQ3 are created using the universal code book 94, and speaker adaptation as performed using the quantized code books when sound is recognized. However, this is not limited to this example, and speaker adaptation can be performed using a mapping function which has been created from the registration word data RD1, RD2, and RD3 and the first through third specific speaker group sound model data MD1, MD2, and MD3. Furthermore, speaker adaptation is possible using an inputting speaker code book (a code book before vector quantization using the universal code book 94) which has been created by the mapping function and the first through third specific speaker group code books CB1, CB2, and CB3.

Furthermore, in the embodiment described earlier, this is an example where speakers (speaker numbers 1, 2, and 3) who belong to a plurality of speaker groups use one device. Therefore, a specific speaker group sound model data is provided as corresponding first through third specific speaker group sound model data MD1, MD2, and MD3. However, depending upon the type of the device, there are cases that only speakers (for example, children) who belong to the same speaker group are the users of the device. In this case, the specific speaker group sound model data can provide the corresponding specific speaker group sound model data only. According to this, the capacity of the ROM 9 can be significantly reduced, processing ability of the controller 5 can be small, the capacity of the RAM 10 can be small, and the cost of the entire device can be significantly reduced.

Furthermore, in the embodiment described earlier, an example is given in which the setting of various modes is performed by various buttons disposed in the operating part or the like, but it is also possible to set by sound only, instead of disposing buttons.

In addition, the processing program which performs the processing of this invention described above can be recorded on a recording medium such as a floppy disk, an optical disk, or a hard disk. This invention also includes the recording medium. Furthermore, it is also acceptable to obtain the processing program from a network.

In this invention described above, several words are selected as registration words among a plurality of recognizable wordswhich are prepared in advance, and the speaker which is the recognition target speaks the respective registration words. Registration word data for the respective registration words is created from the sound data and is saved. In particular, by selecting frequently-used words as the registration words, it is possible to improve the recognition capability for these words, the recognition percentage for all the recognizable words can be improved, and the device becomes very convenient.

Additionally, as the speaker creates the corresponding registration word data, by thus using several words as registration words, speaker learning processing can be performed using the registration word data, standard speaker sound model data, or specific speaker group sound model data. By so doing, with respect to recognizable words other than the registration words, speech recognition is also possible by speaker adaptation using the data which has been learned from the speaker, and the recognition percentage can be significantly improved with respect to all the recognizable words in addition to the registration words.

Furthermore, an inputting speaker code book which has been created by code mapping of any of the code books which have been created based upon the standard speaker sound model data or the specific speaker group sound model data is created. The inputting this speaker code book is vector-quantized using a universal code book which has been created from a wide variety of speakers, a quantized inputting speaker code book is created, and recognition processing is performed through speaker adaptation using the quantized inputting speaker code book. By thus using the quantized inputting speaker code book in which the data amount has been significantly reduced, the recognition processing is possible through speaker adaptation, so the memory (RAM) which stores the quantized code book can be minimized, and the calculation amount which is needed for the recognition processing can be significantly reduced. Therefore, the processing burden of the controller (CPU) can be significantly reduced, and the processing can be performed by a CPU with a small processing ability.

Furthermore, in this invention, the speaker who is a recognition target is focused into an area which is set in advance based upon age and gender, specific speaker group sound model data is created from the sound data of many non-specific speakers who belongs to the area and is saved, and sound which has been input by the speaker who is the recognition target is recognized using the specific speaker group sound model data. By so doing, because only the specific speaker group sound model data corresponding to the speaker group within a certain area is needed, in contrast to standard speaker sound model data which has been created in order to correspond to speakers in all the areas, the data amount can be significantly reduced. Therefore, the memory capacity (ROM) which stores the specific speaker group sound model data can be small, the burden of the recognition processing on the CPU can be reduced. This is a speech recognition technology which is appropriate to inexpensive products which have large limitations on the memory capacity and the processing ability of the CPU. Furthermore, because of the specific speaker group sound model data corresponding to a specific speaker group, the recognition capability is significantly improved.

In addition, in this invention, several specific speaker group sound model data can be prepared corresponding to speaker groups within certain areas. For example, specific speaker group sound model data corresponding to several speaker groups such as male adults, female adults, and children can be prepared. According to this, this device can be used for the case where one device is used by family. Thus, even if specific speaker group sound model data corresponding to several speaker groups is provided, the size of the sound model data can be minimized, compared to standard speaker sound model data which has been created to correspond to a variety of speakers. Furthermore, because it is sound model data corresponding to the respective speaker groups, the recognition capability is significantly improved.

What is claimed is:

1. A speech recognition method, comprising:
   creating standard speaker sound model data from a plurality of non-specific speaker sound data and recognizing a predetermined plurality of words;
   selecting several words as registration words among a plurality of recognizable words, a recognition target speaker speaking the respective registration words;
   creating and storing registration word data for the respective registration words from the sound data; and
   recognizing registration words spoken by the recognition target speaker using the registration word data, and recognizing words other than the registration words using the standard speaker sound model data.

2. The speech recognition method as set forth in claim 1, further comprising:
   dividing the plurality of recognizable words according to respective categories of words;
   preparing word sets which correspond to the respective categories;

setting a device to recognize words which belong to a given word set that are input in an operating scene at a given point in time;

determining from which word set the input word belongs at a current point in time; and recognizing the input word based upon the determination result.

3. The speech recognition method as set forth in claim 1, further comprising:

categorizing the recognition target speaker into a predetermined area based upon age and gender;

creating specific speaker group sound model data from the sound data of a plurality of non-specific speakers who belong to the predetermined area; and storing the specific speaker group sound model data as the standard speaker sound model data.

4. The speech recognition method as set forth in claim 3, the recognition target speakers including a plurality of speaker groups based upon the characteristics of sound, and the specific speaker group sound model data including specific speaker group sound model data corresponding to the plurality of speaker groups which have been created from the sound data of a plurality of non-specific speakers which belong to the respective speaker groups.

5. The speech recognition method as set forth in claim 1, further comprising:

performing speaker learning processing using at least one of the registration word data, the standard speaker sound model data, or the specific speaker group sound model data, and when recognizable words other than the registration words are recognized, recognizing sound by using the post-speaker learning data for speaker adaptation.

6. The speech recognition method as set forth in claim 5, further comprising:

creating an inputting speaker code book from the speaker learning processing using a code book mapping process and any code book which has been created based upon the standard speaker sound model data or the specific speaker group sound model data.

7. The speech recognition method as set forth in claim 5, further comprising:

creating a quantized inputting speaker code book by using a universal code book, the quantized inputting speaker code book being vector-quantized.

8. A speech recognition device which has standard speaker sound model data which has been created from the sound data of a plurality of non-specific speakers, and which can recognize a predetermined plurality of words, comprising:

a sound analysis unit which analyzes sound which has been obtained as a speaker speaks;

a storage device for storing registration word data in which several words among the plurality of recognizable words are selected as registration words, the registration word data being created for the respective registration words from sound data which has been obtained as the recognition target speaker speaks the respective registration words; and a controller which, when one of the registration words is spoken by the recognition target speaker, performs speech recognition using the registration word data, and which, when recognizable words other than the registration words are spoken, performs speech recognition using the standard speaker sound model data.

9. The speech recognition device as set forth in claim 8, the plurality of recognizable words being divided according to a respective category of words and are prepared as word sets which correspond to the respective categories, the device being set to recognize words which belong to a given word set that are input in an operating scene at a given point in time, determine from which word set the input word belongs at the current point in time, and based upon the determination result, recognize the input word.

10. The speech recognition device as set forth in claim 8, the recognition target speaker being categorized into a predetermined area based upon age and gender, and specific speaker group sound model data is created from the sound data of a plurality of non-specific speakers which belong to the predetermined area, and stored as the standard speaker sound model data.

11. The speech recognition device as set forth in claim 10, the recognition target speakers including a plurality of speaker groups based upon the characteristics of sound, and the specific speaker group sound model data including specific speaker group sound model data corresponding to the plurality of speaker groups which have been created from the sound data of a plurality of non-specific speakers which belong to the respective speaker groups.

12. The speech recognition device as set forth in claim 8, speaker learning processing being performed using the registration word data, the standard speaker sound model data, or the specific speaker group sound model data, and when recognizable words other than the registration words are recognized, recognizing sound by using post-speaker learning data for speaker adaptation.

13. The speech recognition device as set forth in claim 12, the speaker learning processing creating an inputting speaker code book using a code book mapping method and any code book which has been created based upon the standard speaker sound model data or the specific speaker group sound model data.

14. The speech recognition device as set forth in claim 12, a quantized inputting speaker code book being created by using a universal code book, the quantized inputting speaker code book being vector-quantized.

15. A recording medium on which is recorded a speech recognition processing program that has standard speaker sound model data which has been created from sound data of a plurality of non-specific speakers, and which is a recording medium on which is recorded a speech recognition processing program which can recognize a predetermined plurality of words, the processing program comprising:

a procedure which, with respect to several words which are selected as registration words among the plurality of recognizable words, creates and saves registration word data for the respective registration words from sound data which has been obtained as the recognition target speaker speaks, and a procedure which, when a registration word is spoken by the recognition target speaker, performs speech recognition using the registration word data, and which, when a recognizable word other than recognizable words is spoken, recognizes the sound using the standard speaker sound model data.

16. The recording medium on which is recorded the speech recognition processing program as set forth in claim 15, the plurality of recognizable words being divided according to a respective category of words and are prepared as word sets which correspond to the respective categories, a device being set to recognize words which belong to a given word set when input in the operating scene at a given point in time and determine from which word set the input word belongs at the current point in time, and based upon the determination result, recognize of the input word.

17. The recording medium on which is recorded the speech recognition processing program as set forth in claim 15, further comprising:
a procedure in which the recognition target speaker is categorized into a predetermined area based upon age and gender, and specific speaker group sound model data is created from the sound data of a plurality of non-specific speakers which belong to the area, and saved as the standard speaker sound model data.

18. The recording medium on which is recorded the speech recognition processing program as set forth in claim 17, the specific speaker group sound model data being created and stored as the standard speaker sound model data, the recognition target speakers including a plurality of speaker groups based upon characteristics of sound, and for the specific speaker group sound model data, specific speaker group sound model data corresponding to the plurality of speaker groups being created from sound data from a plurality of non-specific speakers which belong to the respective speaker groups.

19. The recording medium on which is recorded the speech recognition processing program as set forth in claim 15, further comprising:
a procedure in which speaker learning processing is performed using the registration word data, the standard speaker sound model data, or the specific speaker group sound model data, and when recognizable words other than the registration words are recognized, sound is recognized by using the post-speaker learning data for speaker adaptation.

20. The recording medium on which is recorded the speech recognition processing program as set forth in claim 19, the speaker learning processing creating an inputting speaker code book by a code book mapping method and any code book which has been created based upon the standard speaker sound model data or the specific speaker group sound model data.

21. The recording medium on which is recorded the speech recognition processing program as set forth in claim 19, a quantized inputting speaker code book being created using a universal code book, the quantized inputting speaker code book being vector-quantized.

* * * * *